(12) United States Patent
Dinnage et al.

(10) Patent No.: US 9,011,576 B2
(45) Date of Patent: Apr. 21, 2015

(54) LIQUID SORBANT, METHOD OF USING A LIQUID SORBANT, AND DEVICE FOR SORBING A GAS

(76) Inventors: Paul Dinnage, New Braunfels, TX (US); Roland Kalb, Leoben (AT)

(*) Notice: Subject to any disclaimer, the term of this patent is extended or adjusted under 35 U.S.C. 154(b) by 0 days.

(21) Appl. No.: 13/166,235

(22) Filed: Jun. 22, 2011

(65) Prior Publication Data

US 2011/0247494 A1    Oct. 13, 2011

Related U.S. Application Data

(63) Continuation-in-part of application No. PCT/EP2010/058856, filed on Jun. 22, 2010.

(30) Foreign Application Priority Data

Jun. 25, 2009  (EP) .................................... 09163831

(51) Int. Cl.
*B01D 53/14* (2006.01)

(52) U.S. Cl.
CPC ........ *B01D 53/1456* (2013.01); *B01D 53/1493* (2013.01); *B01D 2252/30* (2013.01); *Y02C 10/06* (2013.01); *Y02C 10/08* (2013.01)

(58) Field of Classification Search
CPC .............................. B01D 53/00; B01D 53/14
USPC ....................... 95/149, 166; 96/234
See application file for complete search history.

(56) References Cited

U.S. PATENT DOCUMENTS

| | | | |
|---|---|---|---|
| 4,045,538 A | 8/1977 | Sare et al. | |
| 4,059,677 A | 11/1977 | Sare et al. | |
| 4,065,543 A | 12/1977 | Sare et al. | |
| 4,121,433 A | 10/1978 | Pomerantz | |
| 4,134,743 A | 1/1979 | Macriss et al. | |
| 4,164,125 A | 8/1979 | Griffiths | |
| 4,189,848 A | 2/1980 | Ko et al. | |
| 4,295,816 A | 10/1981 | Robinson | |
| 4,419,236 A | 12/1983 | Hsu | |
| 4,433,553 A | 2/1984 | Callihan | |

(Continued)

FOREIGN PATENT DOCUMENTS

| | | |
|---|---|---|
| EP | 1 048 540 A1 | 11/2000 |
| GB | 268429 | 3/1927 |

(Continued)

OTHER PUBLICATIONS

Bernard P. Binks, Amro K. F. Dyab and Paul D. I. Fletcher Surfactant & Colloid Group, Department of Chemistry, University of Hull, Hull, UK HU6 7RX. Chem. Commun. pp. 2540-2541.*

(Continued)

*Primary Examiner* — Duane Smith
*Assistant Examiner* — Joubert X Glover
(74) *Attorney, Agent, or Firm* — Oliff PLC

(57) ABSTRACT

A method for sorbing a gas using an ionic liquid to sorb a vapor having an electric multi-pole moment. The ionic liquid comprises an anion and a cation. The electric multi-pole moment may be an electric dipole moment and/or an electric quadru-pole moment. The sorption may be an adsorption or an absorption. The ionic liquid may be a liquid that substantially contains only anions and cations, while not containing other components, such as water. Alternatively, a solution containing the ionic liquid and a solvent or further compound, such as water, may be used.

37 Claims, 13 Drawing Sheets

(56) References Cited

U.S. PATENT DOCUMENTS

| | | | |
|---|---|---|---|
| 4,475,483 | A | 10/1984 | Robinson |
| 4,793,143 | A | 12/1988 | Rhodes |
| 4,805,317 | A | 2/1989 | Inglis et al. |
| 5,123,481 | A | 6/1992 | Albers et al. |
| 5,146,978 | A | 9/1992 | Albers et al. |
| 5,182,921 | A | 2/1993 | Yan |
| 5,189,581 | A | 2/1993 | Schroder et al. |
| 5,351,497 | A | 10/1994 | Lowenstein |
| 5,610,878 | A | 3/1997 | Pretat et al. |
| 5,863,318 | A | 1/1999 | Bursell |
| 6,158,237 | A | 12/2000 | Riffat et al. |
| 6,273,942 | B1 | 8/2001 | Jersby |
| 6,305,414 | B1 | 10/2001 | Kozinski |
| 6,316,687 | B1 | 11/2001 | Davis et al. |
| 6,328,061 | B1 | 12/2001 | Kozinski |
| 6,358,300 | B1 | 3/2002 | Fornof et al. |
| 6,508,598 | B2 | 1/2003 | Twist et al. |
| 6,514,321 | B1 | 2/2003 | Lehto et al. |
| 6,579,343 | B2 * | 6/2003 | Brennecke et al. ........... 95/51 |
| 6,745,826 | B2 | 6/2004 | Lowenstein et al. |
| 6,852,229 | B2 | 2/2005 | Mehnert et al. |
| 6,854,278 | B2 | 2/2005 | Maisotsenko et al. |
| 6,854,279 | B1 | 2/2005 | Digiovanni et al. |
| 6,887,442 | B2 | 5/2005 | Hommeltoft |
| 6,899,749 | B2 | 5/2005 | Johansson |
| 6,935,131 | B1 | 8/2005 | Backman |
| 7,037,554 | B2 | 5/2006 | Tao et al. |
| 7,053,261 | B2 | 5/2006 | Herbst et al. |
| 7,077,950 | B2 * | 7/2006 | Hommeltoft ........... 208/187 |
| 7,269,966 | B2 | 9/2007 | Lowenstein et al. |
| 7,338,548 | B2 | 3/2008 | Boutall |
| 7,431,900 | B2 | 10/2008 | Hill et al. |
| 7,459,011 | B2 * | 12/2008 | Cadours et al. ........... 95/178 |
| 7,470,829 | B2 * | 12/2008 | Cadours et al. ........... 585/833 |
| 7,527,775 | B2 * | 5/2009 | Chinn et al. ........... 423/226 |
| 7,528,287 | B2 | 5/2009 | Harmer et al. |
| 7,563,306 | B2 | 7/2009 | Boutall et al. |
| 7,687,139 | B2 | 3/2010 | Chan et al. |
| 7,838,684 | B2 | 11/2010 | Harmer et al. |
| 2002/0046475 | A1 | 4/2002 | Cho et al. |
| 2003/0149411 | A1 | 8/2003 | Keuhn, Jr. et al. |
| 2004/0031282 | A1 | 2/2004 | Kopko |
| 2004/0035293 | A1 * | 2/2004 | Davis, Jr. ........... 95/140 |
| 2004/0261440 | A1 | 12/2004 | Forkosh et al. |
| 2005/0129598 | A1 * | 6/2005 | Chinn et al. ........... 423/226 |
| 2005/0205468 | A1 * | 9/2005 | Cadours et al. ........... 208/189 |
| 2006/0197053 | A1 | 9/2006 | Shiflett et al. |
| 2006/0272934 | A1 * | 12/2006 | Beste et al. ........... 203/24 |
| 2007/0100181 | A1 | 5/2007 | Harmer et al. |
| 2007/0100184 | A1 | 5/2007 | Harmer et al. |
| 2007/0142532 | A1 | 6/2007 | Lee |
| 2007/0144186 | A1 | 6/2007 | Shiflett et al. |
| 2008/0083232 | A1 | 4/2008 | Lee |
| 2008/0134895 | A1 * | 6/2008 | Ruud et al. ........... 96/9 |
| 2008/0307802 | A1 | 12/2008 | Forkosh |
| 2009/0053133 | A1 | 2/2009 | Zaluska et al. |
| 2009/0105430 | A1 | 4/2009 | Ito et al. |
| 2009/0211276 | A1 | 8/2009 | Forkosh |
| 2010/0090356 | A1 | 4/2010 | Sines et al. |
| 2010/0132391 | A1 | 6/2010 | Barot |
| 2010/0174120 | A1 | 7/2010 | Harmer et al. |
| 2010/0204521 | A1 | 8/2010 | Harmer et al. |
| 2010/0228035 | A1 | 9/2010 | Davis, Jr. |
| 2010/0266748 | A1 | 10/2010 | Bressers et al. |

FOREIGN PATENT DOCUMENTS

| | | |
|---|---|---|
| GB | 724413 | 2/1955 |
| GB | 912091 | 12/1962 |
| JP | A-64-22324 | 1/1989 |
| JP | A-04-61909 | 2/1992 |
| WO | WO 99/54667 A1 | 10/1999 |
| WO | WO 2004/007045 A1 | 1/2004 |
| WO | WO 2004/101118 A2 | 11/2004 |
| WO | WO 2005/021484 A2 | 3/2005 |
| WO | WO 2006/104446 A1 | 10/2006 |
| WO | WO 2006/125175 A2 | 11/2006 |
| WO | WO 2006/136771 A1 | 12/2006 |
| WO | WO 2010/016040 A1 | 2/2010 |
| WO | WO 2010/122150 A1 | 10/2010 |

OTHER PUBLICATIONS

Scovazzo, Paul. Gas separations using non-hexafluorophosphate anion supported ionic liquid membranes. Elsevier. Journal of membrane Science vol. 238. Issues 1-2 pp. 57-63.*

Seddon, K. R., Ionic Liquids for Clean Technology, J. Chem. Tech. Biotechnol, 68:351-356 (1997).*

Tran, C., et al., "Absorption of Water by Room-Temperature Ionic Liquids: Effect of Anions on Concentration and State of Water," Applied Spectroscopy, vol. 57, No. 2, 2003, pp. 152-157.

Yamanouchi, N., et al., "Gas and Vapor Permeation through Liquid Membrane Using Ionic Liquid," Transactions ofthe Materials Research Society of Japan, vol. 29, No. 7, 2004, pp. 3299-3302.

Noble, R., et al., "Gas Sorption Using Ionic Liquids," Proceedings of International Solvent Extraction Conference 2008, vol. 2, pp. 1301-1306.

Scovazzo, P., "Testing and evaluation of room temperature ionic liquid (RTIL) membranes for gas dehumidification," Journal of Membrane Science, vol. 355, 2010, pp. 7-17.

Heym, F., et al., "Vapor Pressure of Water in Mixtures with Hydrophilic Ionic LiquidsA Contribution to the Design of Processes for Drying of Gases by Absorption in Ionic Liquids," Chemical Engineering and Technology, vol. 33, No. 10, 2010, pp. 1625-1634.

Conde-Petit, M. "Liquid Desiccant-Based Air-Conditioning Systems-LDACS," $1^{st}$ European Conference on Polygeneration, Oct. 16-17, 2007, pp. 217-234.

Liu, X., et al., "Research progress in liquid desiccant air-conditioning devices and systems," Front. Energy Power Eng. China 2010, vol. 4, No. 1, pp. 55-65.

Öberg, V., et al., "Experimental Study ofthe Heat and Mass Transfer in a Packed Bed Liquid Desiccant Air Dehumidifier," Journal of Solar Energy Engineering, vol. 120, Nov. 1998, pp. 289-297.

Heinzen, R., et al., "Theoretical Performance Analysis of a Liquid Desiccant Air-Conditioning System for Air Heating and Cooling," Proc. $2^{nd}$ International Conference Solar Air-Conditiong, Tarragona (ES), Oct. 18-19, 2007, CD.

Nayak, S., et al., "Second Generation Integrated Combined Heat and Power Engine Generator and Liquid Desiccant System," 2004 ASME International Mechanical Engineering Congress and Exposition, Nov. 13-20, 2004, Anaheim, California, IMECE2004-60801.

Xie, X., et al., "Simulation Analysis on the Fresh Air Handling Unit With Liquid Desiccant Total Heat Recovery," Proceedigs: Building Simulation 2007, pp. 642-648, http://www.ibpsa.org/proceedings/BS2007/p829_final.pdf.

Seddon, K., et al., "Influence of chloride, water, and organic solvents on the physical properties of ionic liquids," Pure Applied Chemistry, vol. 72, No. 12, pp. 2275-2287, 2000.

Huddleston, J., et al. "Characterization and comparison of hydrophilic and hydrophobic room temperature ionic liquids incorporating the imidazolium cation," Green Chemistry, vol. 3, pp. 156-164, 2001.

Ahmed, S., et al., "Thermodynamic Analysis of Liquid Desiccants," Solar Energy, vol. 62, No. 1, pp. 11-18, 1998.

Longo, G., et al., "Experimental Analysis on Chemical Dehumification of Air by Liquid Desiccant and Desiccant Regeneration in a Packed Tower," Journal of Solar Energy Engineering, vol. 126, No. 1, pp. 587-591, Feb. 2204.

Gommed, K., et al., "A Liquid Desiccant System for Solar Cooling and Dehumidification," Journal of Solar Energy Engineering, vol. 126, No. 3, pp. 879-885, Aug. 2004.

Thurston, E. F., "Gas drying by calcium chloride solutions: The mechanism of transfer," Journal of the Society of Chemical Industry, vol. 67, No. 7, pp. 289-296, Jul. 1948.

* cited by examiner

LIQUID SORBANT, METHOD OF USING A LIQUID SORBANT, AND DEVICE FOR SORBING A GAS

BACKGROUND

The invention relates to a liquid sorbant, in particular for sorbing vaporous molecules having an electric multi-pole moment.

Further, the invention relates to a device for sorbing vapor from a gas source.

Excessive water vapor ($H_2O$ vapor) may be an undesired component that is present in many gas sources, including ambient air. In order to improve the quality of the gas source, the amount of $H_2O$ vapor should be reduced to acceptable specifications. Various technologies have been employed for $H_2O$ vapor removal including cooling of gas streams, or treatment with chemical solvents, physical solvents, adsorbants, absorbants and membranes. One traditional technique is liquid refrigerant expansion-compression air conditioning systems.

Furthermore, processes for removal of $H_2O$ from gas sources using liquid desiccants, such as lithium chloride (LiCl) and calcium chloride ($CaCl_2$), which contact a gas source containing a high percentage of $H_2O$ with an absorbent comprising the liquid desiccant, are known. The contact occurs at absorption conditions, to absorb at least a portion of the $H_2O$ vapor from the $H_2O$ vapor-containing gas source and forming a $H_2O$ vapor-absorbent complex. Afterwards, the gas source having a reduced $H_2O$ content is recovered, and the amount of $H_2O$ vapor in the $H_2O$ absorbent complex is reduced, such as by heating.

However, known liquid desiccants are corrosive and/or toxic and, thus, have a negative impact on the environment and may result in increased time and cost to manufacture and/or maintain devices for sorbing gasses. Also, conventional liquid desiccants contain solid, inorganic salts that may precipitate out at high concentrations and low relative humidity.

Although desiccation is referred to in various portions of the specification, the scope of this disclosure is not limited thereto. Desiccation is a common adsorption process and is used as an exemplary adsorption process throughout the specification. However, the concepts recited herein and directed to desiccation are equally applicable to adsorption processes for other multi-pole molecules, such as $CO_2$, etc. Thus, throughout this specification "water vapor" or similar terms may be considered to encompass other multi-pole molecules.

SUMMARY

An objective is to provide a method for removing a vaporous component from a gas source, and a device for removing a vaporous component from a gas source, which is safer or less expensive to use than known methods and devices. According to this application the terms "vapor" and "vaporous" may be used interchangeably, i.e. no distinction is made between these two terms.

This objective may be solved by using an ionic liquid, or preferably a room temperature ionic liquid (RTIL), more preferably an ionic liquid that remains in a liquid state with sorbic loadings typical in a specific sorbant process, in particular as a liquid sorbant for sorption of a vapor having an electric multi-pole moment and a device using the ionic liquid for sorption of a vapor.

An ionic liquid may be used as a sorbant for sorption of a vapor having an electric multi-pole moment, wherein the ionic liquid comprises an anion and a cation. The cation may be a coordinating cation, which is capable of interacting with the multipole-moment vapor molecules by means of Coulomb forces, hydrogen bonding, Van der Waals forces, etc.

In particular, the electric multi-pole moment may be an electric dipole moment and/or an electric quadrupole moment. The sorption may be an adsorption or an absorption. Initially, the ionic liquid may be a pure ionic liquid, i.e. a liquid substantially containing only anions and cations, while not containing other components, e.g. water. Alternatively, the initial ionic liquid may be a solution containing the ionic liquid and a solvent or further compound, e.g. water, may be used. In the most generic form, the ionic liquids may be represented by $[Q^+]_n[Z^{n-}]$, wherein Q represents a cation, which may be produced by a process as described, for example, in WO 2005/021484 that is hereby totally incorporated by reference in its entirety.

There are many benefits of using ionic liquids as sorbants. Ionic liquids are liquid at most working conditions and, in many cases, ionic liquids are liquid even at low temperatures. Room temperature ionic liquids may be liquid as pure substances, which means that they do not crystallize at low temperatures or low to zero water content, such as 100 ppm or less. Compared to LiCl and $CaCl_2$, ionic liquids have very low corrosion, similar desorption temperature and enthalpies, good shape of the isotherms, are not volatile compared to triethylene glycol, and may be selected to be not as toxic.

The term "ionic liquid" may include all liquid organic salts and mixtures of salts consisting of organic cations, organic anions, or inorganic anions. Moreover, additional hygroscopic or even non-hygroscopic salts with inorganic cations and organic or inorganic anions may be dissolved in the ionic liquid, containing, but definitely not limited to, the identical anion or identical anions as found in the basic ionic liquid. Small amounts of additives may be dissolved in the ionic liquid. The ionic liquids may have a melting point of less than about 250° C., such as less than about 200° C., 175° C., 150° C., 125° C., and less than about 100° C. According to the generally accepted literature (e.g. Wasserscheid, Peter; Welton, Tom (Eds.); "Ionic Liquids in Synthesis," Wiley-VCH 2008; ISBN 978-3-527-31239-9), ionic liquids are melts of low melting salts with melting points equal to or below 100° C. However, the melting temperature of ≤100° C. is chosen arbitrarily by definition. Therefore, according to this application, salts with melting temperatures >100° C. but <250° C. are included as ionic liquids as well. A cation and an anion may be linked by, for example, an alkyl group to form a zwitterionic ion.

The liquid sorbant is based on ionic liquids as defined above. The ionic liquid component or components itself may not be liquid at typical working condition temperatures, e.g. −20° C. to +160° C. To keep the liquid sorbant, which is based on ionic liquids, liquid at these working temperatures, especially at the low working temperatures, additional polar solvents like water or organic solvents like alcohols, polyalcohols, ethers, polyethers, ketones, amides, sulfoxides, sulfones, esters, aminoxides, etc. can be added.

The ionic liquid and the polar solvents may form a homogenous mixture, or they may form an emulsion.

The term "based on an ionic liquid," as used herein, denotes the component or group of components that have the highest percentage, and is (are) an ionic liquid(s) or is (are) formed by a mixture of ionic liquids. For example, the amount of water in the desiccant fluid may be between 1 and 90 mass %, such as between 5 and 80 mass %, between 7 and 70 mass %, between 9 and 60 mass %, and between 10 and 50 mass %. For example, the amount of molecular solvents in the desiccant fluid may be between 0.1 and 20 mass %, such as between 0.1 and 10 mass %, and between 0.1 and 5 mass %.

A device for sorption of a vapor having an electric multi-pole moment is provided, wherein the device comprises a reservoir of an ionic liquid comprising an anion and a cation. The device also comprises a' surface on which the ionic liquid is dispersed and re-circulated to contact a source of gas.

The device may comprise an inlet, a container including the ionic liquid and, optionally, an outlet. The device may be used to sorb vapor having an electric multi-pole moment, e.g. $CO_2$ and/or $H_2O$ vapor, from a medium that is selected from the group consisting of compressed air, inhaled air, exhaled air, and ambient air. The device may include a heat pump or act as an air conditioner, and include a means for regenerating the ionic liquid in order to remove the sorbed di/multi-pole. The device may comprise a circuit including $CO_2$ and/or $H_2O$ vapor and the ionic liquid, which comprises an anion and a cation, as working media. Using a pair of working media containing $CO_2$ and/or $H_2O$ vapor and an ionic liquid in a device may be advantageous because $CO_2$ and/or $H_2O$ vapor are not toxic and are of less concern with respect to environmental effects compared to other vaporizable working substances.

The ionic liquid may serve as a solvent, dispersion agent, or gelling agent to dissolve, disperse or gel hygroscopic particles. The hygroscopic particles may include silica gel, alumina, activated carbon, zeolite, or molecular sieve, such as 4A or 13x molecular sieve, polysaccharides, polyalcohols, polymer desiccants, or any other hygroscopic materials or adsorbent materials. The particles may be of 1 micron to 100 microns in size. The addition of hygroscopic particles to the ionic liquid can be chosen in order to manipulate the shape of the composite slurry isotherm. For example, the addition of molecular sieve will enhance the capacity to adsorb/absorb at low vapor pressures. Due to the large molecular size of many ionic liquids they will not have the same masking effect as LiCl and other hygroscopic salts with respect to molecular sieve, which due to their size and polarity, would be preferentially attracted to the same sites that would attract the desired sorbate.

In embodiments, a method of using an ionic liquid for sorption of a gas having an electric multi-pole moment is provided, wherein the ionic liquid comprises a carbanion and a cation.

Such ionic liquids may be a suitable medium to sorb specific gases, e.g. $CO_2$ vapor or $H_2O$ vapor, out of a mixture of gases with breathing air and may also be suitable to release these specific gases or vapor again. The specific gases or vapor and the ionic liquid may form a complex, i.e., the specific gases or vapor may be bound in a complex. Using such ionic liquids for sorption of gases or vapors may be advantageous because ionic liquids having no, or at least substantially no, vapor pressure (e.g., a non-measurable vapor pressure or even a vapor pressure in the same magnitude of order of steel) may be used. Thus, the gases, vapors, or mixture of gases and vapors may not be contaminated by vapors of the ionic liquid. For example, the removal of $CO_2$ by using ionic liquids may exhibit an improved performance even in cases where the vapor pressure of $CO_2$ is low. For example, the desorption process may be enhanced by providing lower pressures during desorption.

BRIEF DESCRIPTION OF THE DRAWINGS

The invention will be described in more detail hereinafter with reference to examples of embodiments, but the invention is not limited thereto.

DETAILED DESCRIPTION OF EMBODIMENTS

Figure 1A:
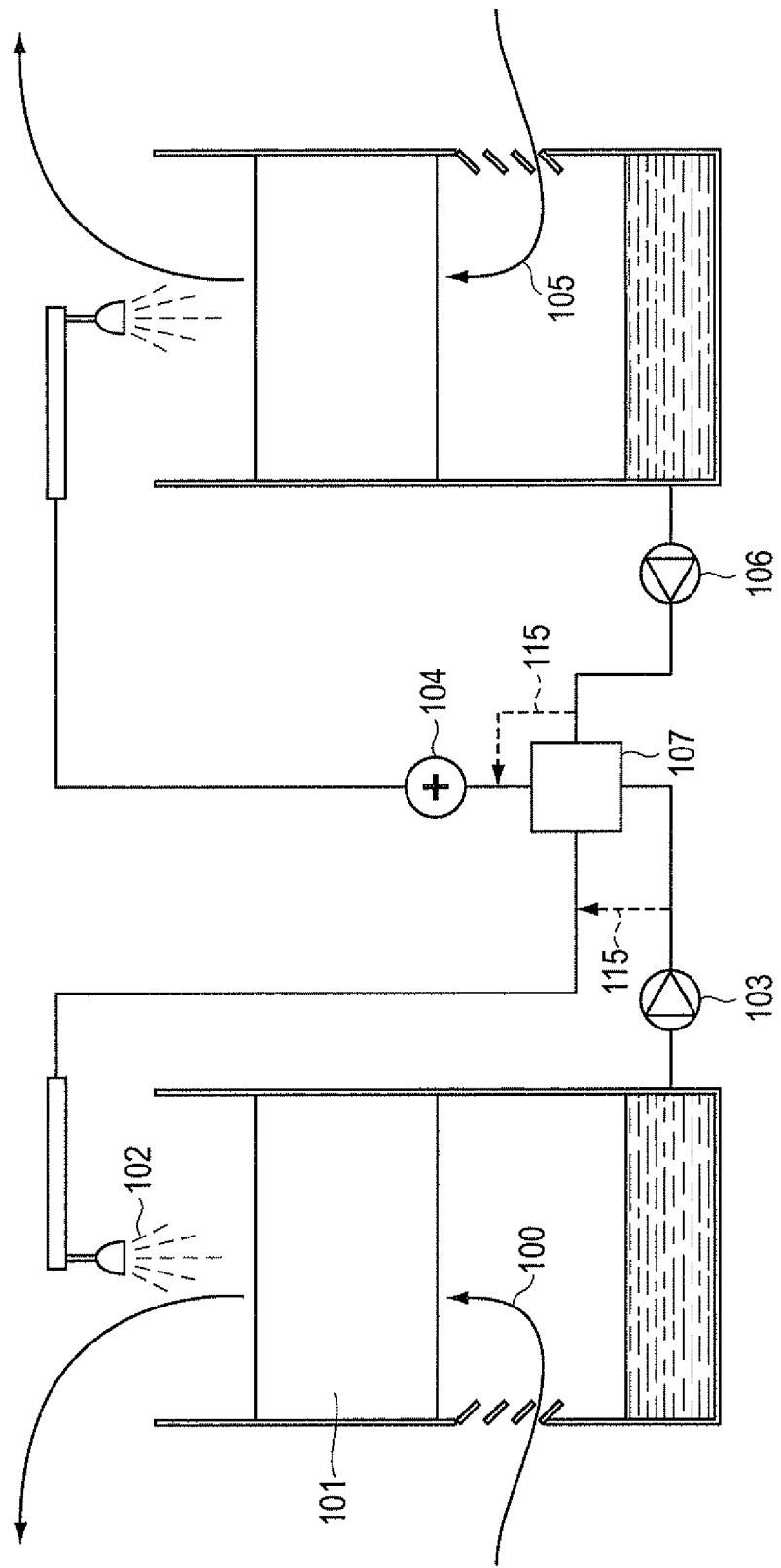
FIG. 1A illustrates a basic dehumidifier arrangement.

Further aspects of embodiments of the method of using an ionic liquid for sorption of a gas are described below. However, this disclosure also applies to the device for sorption of a gas.

The ionic liquid may satisfy the generic formula $[Q^+][A^-]$, wherein the anion may be described by one of the following structures:

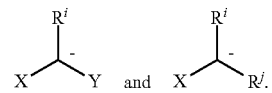

The anion may be described by the resonant or mesomeric states:

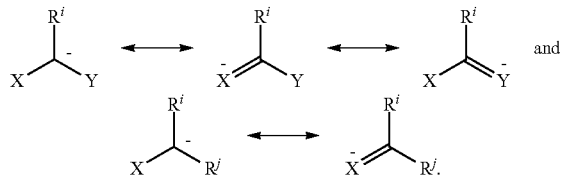

wherein X and Y may indicate, independently from each other, groups that may attract electrons due to the inductive effect or the mesomeric effect and/or that may delocalize and/or stabilize (localize) electrons. Examples for such groups may be: —CN, —$NO_2$, —$NO_3$, CO—$R^k$, —COO$R^k$, —C=N—$R^k$, —CO—NR$^k$R$^m$, —NR$^k$R$^m$, —OH, —OR$^k$, —SH, —SR$^k$, —SO—$R^k$, —$SO_2$—$R^k$, —$SO_2$—OR$^k$, —PO—OR$^k$OR$^m$ (phosphonate), —I, —Cl, —Br, —F, —$CCl_3$, —$CCl_2$R$^k$, —CClR$^k$R$^m$, —$CF_3$, —$CF_2$R$^k$, —CFR$^k$R$^m$, —$SO_2CF_3$, —COO$CF_3$, $C_6H_5$, —CR$^k$=CR$^m$R$^n$, —C/CR$^m$, —CR$^k$=CR$^m$—CN, —CR$^k$=CR$^m$—$NO_2$, —CR$^k$=CR$^m$—CO—R$^k$, —CR$^k$=CR$^m$—COOR$^k$, —CR$^k$=CR$^m$—C=N—R$^n$, —CR$^k$=CR$^m$—CO—NR$''$R$^o$, —CR$^k$=CR$^m$—NR$''$R$^o$, —CR$^k$=CR$^m$—OR$^n$, —CR$^k$=CR$^m$—SR$^n$, —CR$^k$=CR$^m$—

SO—R$^n$, CR$^k$=CR$^m$—SO$_2$—R$^n$, —CR$^k$=CR$^m$— SO$_2$-R$^n$, —CR$^k$=CR$^m$—SO$_2$—OR$^n$, —CR$^k$=CR$^m$—CF$_3$, —CR$^k$=CR$^m$—SO$_2$CF$_3$.

R$^k$, R$^m$, R$^n$, R$^o$ may, independently from each other, denote hydrogen, C$_1$- to C$_{30}$-alkyl and their aryl-, heteroaryl-, cycloalkyl-, halogen-, hydroxy-, amino-, carboxy-, formyl-, —O—, —CO—, —CO—O— or —CO—N substituted components, like methyl, ethyl, 1-propyl, 2-propyl, 1-butyl, 2-butyl, 2-methyl-1-propyl (isobutyl), 2-methyl-2-propyl (tert-butyl), 1-pentyl, 2-pentyl, 3-pentyl, 2-methyl-i-butyl, 3-methyl-1-butyl, 2-methyl-2-butyl, 3-methyl-2-butyl, 2,2-dimethyl-1-propyl, 1-hexyl, 2-hexyl, 3-hexyl, 2-methyl-1-pentyl, 3-methyl-1-pentyl, 4-methyl-1-pentyl, 2-methyl-2-pentyl, 3-methyl-2-pentyl, 4-methyl-2-pentyl, 2-methyl-3-pentyl, 3-methyl-3-pentyl, 2,2-dimethyl-1-butyl, 2,3-dimethyl-1-butyl, 3,3-dimethyl-1-butyl, 2-ethyl-1-butyl, 2,3-dimethyl-2-butyl, 3,3-dimethyl-2-butyl, heptyl, octyl, nonyl, decyl, undecyl, dodecyl, tridecyl, tetradecyl, pentadecyl, hexadecyl, heptadecyl, octadecyl, nonadecyl, icosyl, henicosyl, docosyl, tricosyl, tetracosyl, pentacosyl, hexacosyl, heptacosyl, octacosyl, nonacosyl, triacontyl, phenylmethyl (benzyl), diphenylmethyl, triphenylmethyl, 2-phenylethyl, 3-phenylpropyl, cyclopentylmethyl, 2-cyclopentylethyl, 3-cyclopentylpropyl, cyclohexylmethyl, 2-cyclohexylethyl, 3-cyclohexylpropyl, methoxy, ethoxy, formyl, acetyl or C$_n$F$_{2(n-a)+(1-b)}$H$_{2+b}$, wherein n≤30, 0≤a≤n and b=0 or 1 (e.g. CF$_3$, C$_2$F$_5$, CH$_2$CH$_2$—C$_{(n-2)}$F$_{2(n-2)+1}$, C$_6$F$_{13}$, C$_8$F$_{17}$, C$_{10}$F$_{21}$, C$_{12}$F$_{25}$);

C$_3$ to C$_{12}$-cycloalkyl and their aryl-, heteroaryl-, cycloalkyl-, halogen-, hydroxy-, amino-, carboxy-, formyl-, —O—, —CO— or —CO—O-substituted components e.g. cyclopentyl, 2-methyl-1-cyclopentyl, 3-methyl-1-cyclopentyl, cyclohexyl, 2-methyl-1-cyclohexyl, 3-methyl-1-cyclohexyl, 4-methyl-1-cyclohexyl or C$_n$F$_{2(n-a)+(1-b)}$H$_{2a-b}$ wherein n≤0, 0≤a≤n and b=0 or 1;

C$_2$- to C$_{30}$-alkenyl and their aryl-, heteroaryl-, cycloalkyl-, halogen-, hydroxy-, amino-, carboxy-, formyl-, —O—, —CO— or —CO—O-substituted components (e.g. 2-propenyl, 3-butenyl, cis-2-butenyl, trans-2-butenyl or C$_n$F$_{2(n-a)-(1-b)}$H$_{2a-b}$, wherein n≤30, 0a≤n and b=0 or 1);

C$_3$- to C$_{12}$-cycloalkenyl and their aryl-, heteroaryl-, cycloalkyl-, halogen-, hydroxy-, amino-, carboxy-, formyl-, —O—, —CO— or —CO—O— substituted components, (e.g. 3-cyclopentenyl, 2-cyclohexenyl, 3-cyclohexenyl, 2,5-cyclohexadienyl or C$_n$F$_{2(n-a)-(1-b)}$H$_{2a-b}$ wherein n≤0, 0≤a≤n and b=0 or 1); and aryl or heteroaryl having 2 to 30 carbon atoms and their alkyl-, aryl-, heteroaryl-, cycloalkyl-, halogen-, hydroxy-, amino-, carboxy-, formyl-, —O—, —CO— or —CO—O-substituted components (e.g. phenyl, 2-methyl-phenyl (2-tolyl), 3-methyl-phenyl (3-tolyl), 4-methyl-phenyl, 2-ethyl-phenyl, 3-ethyl-phenyl, 4-ethyl-phenyl, 2,3-dimethyl-phenyl, 2,4-dimethyl-phenyl, 2,5-dimethyl-phenyl, 2,6-dimethyl-phenyl, 3,4-dimethyl-phenyl, 3,5-dimethyl-phenyl, 4-phenyl-phenyl, 1-naphthyl, 2-naphthyl, 1-pyrrolyl, 2-pyrrolyl, 3-pyrrolyl, 2-pyridinyl, 3-pyridinyl, 4-pyridinyl or C$_6$F$_{(5-a)}$H$_a$ wherein 0≤a≤5), wherein pairs of the R$^k$, R$^m$, R$^n$, R$^o$ may be bonded directly to each other or via C$_1$-C$_4$, which may be substituted if necessary, so that a saturated, unsaturated, or conjugated unsaturated ring may be formed.

The ionic liquid may have the generic formula [Q$^+$]$_a$[A$^{a-}$], wherein [A$^{a-}$] with the charge a− is selected out of the group consisting of the following molecules in their deprotonated and therefore anionic form:

dialkyl ketones, dialkyl-1,3-diketones, alkyl-β-keto esters, terminal alkines, linear or cyclic 1,3-thioethers, dialkyl phosphonates, dialkyl malonic acid esters, β-cyano carbonic acids and their respective alkylesters, β-alkoxy carbonic acids and their respective alkylesters, β-cyano nitriles, cyclopentadiene (optionally substituted), trialkylimines, dialkylimines, diaryl ketones, alkyl-aryl-ketones, diaryl-1,3-diketones, diketones, β-aryloxy carbonic acids and their respective alkylesters, β-aryloxy carbonic acids and their respective arylesters, aryl-β-ketoesters, diarylphosphonates, alkyl-aryl-phosphonates, diaryl malonic acid esters, alkyl-aryl-malonic acid esters, β-cyano carbonic acids arylesters and arylimines.

The ionic liquid may satisfy the generic formula [Q$^+$]$_a$[A$^{a-}$], wherein [A]$^{a-}$ is a carbanion formed by deprotonating a chemical compound out of the group consisting of: acetoacetic ester, malonic mononitrile, malonic acid dimethylester, malonic acid diethylester, acetylacetone, malonic acid dinitrile, acetone, diethylketone, methylethylketone, dibutylketone, 1,3-dithian, acetaldehyde, benzaldehyde, crotonaldehyde and butyraldehyde.

The ionic liquid may satisfy the generic formula [Q$^+$]$_a$[A$^{a-}$], wherein [A$^{a-}$] is a carbanion and wherein [Q]$^+$ is one out of the group consisting of quaternary ammonium cation [R$^1$R$^1$R$^2$R$^3$N]$^+$, phosphonium [R$^1$R$^1$R$^2$R$^3$P]$^+$, sulfonium [R$^1$R$^1$R$^2$S]$^+$ and a hetero aromatic cation. The carbanion may be formed by deprotonating a chemical compound out of the group consisting of: acetoacetic ester, malonic mononitrile, malonic acid dimethylester, malonic acid diethylester, acetylacetone, malonic acid dinitrile, acetone, diethylketone, methylethylketone, dibutylketone, 1,3-dithian, acetaldehyde, benzaldehyde, crotonaldehyde and butyraldehyde.

R$^1$, R$^{1'}$, R$^2$, and R$^3$ may be alkyl, alkenyl, alkinyl, cycloalkyl, cycloalkenyl, aryl or heteroaryl, which may be independently substituted.

Two of the moieties R$^1$, R$^{1'}$, R$^2$, and R$^3$ may form a ring together with a hetero-atom to which they are bound. The ring may be saturated, unsaturated, substituted or unsubstituted. The chain may be interrupted by one or more hetero-atoms out of the group consisting of O, S, NH or N—C1-C$_4$-alkyl.

The hetero aromatic cation may be a 5 or 6 membered ring comprising at least one N and if necessary one 0 and/or one S. The hetero aromatic cation may be substituted or unsubstituted and/or annelated. The hetero aromatic cation may be selected from the group consisting of:

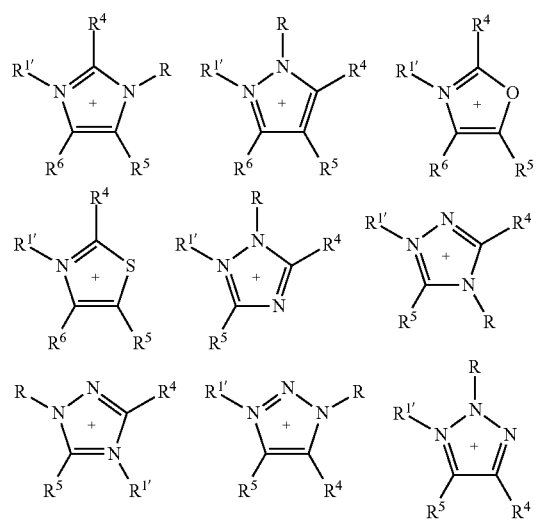

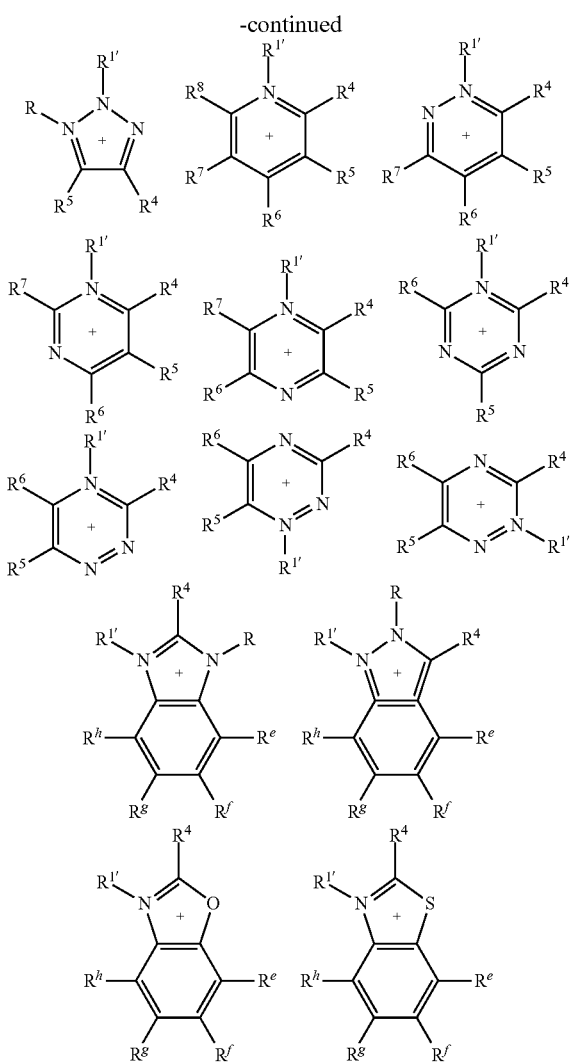

wherein the moieties R may be one of the following: hydrogen, $C_1$-$C_{30}$-alkyl, $C_3$-$C_{12}$-cycloalkyl, $C_2$-$C_{30}$-alkenyl, $C_3$-$C_{12}$-cycloalkenyl, $C_2$-$C_{30}$-alkinyl, aryl or heteroaryl, wherein the latter seven moieties may have one or more halogenic moiety and/or one to three moieties selected from the group consisting of $C_1$-$C_6$-alkyl, aryl, heteroaryl, $C_3$-$C_7$-cycloalkyl, halogen, $OR^c$, $SR^c$, $NR^cR^d$, $COR^c$, $COOR^c$, $CO-NR^cR^d$, wherein $R^c$ and $R^d$ may be hydrogen, $C_1$-$C_6$-alkyl, $C_1$-$C_6$-halogenalkyl, cyclopentyl, cyclohexyl, phenyl, tolyl or benzyl.

$R^1$, $R^{1'}$, $R^2$, and $R^3$ may be hydrogen, alkyl, alkenyl, alkinyl, cycloalkyl, cycloalkenyl, aryl or heteroaryl which may be independently substituted.

Two of the moieties $R^1$, $R^{1'}$, $R^2$, and $R^3$ may form a ring together with a hetero-atom to which they are bound. The ring may be saturated, unsaturated, substituted or unsubstituted. The chain may be interrupted by one or more hetero-atoms out of the group consisting of O, S, NH or N—$C_1$-$C_4$-alkyl.

$R^4$, $R^5$, $R^6$, $R^7$ and $R^8$ may be, independently of each other, hydrogen, halogen, nitro, cyano, $OR^c$, $SR^c$, $NR^cR^d$, $COR^c$, $COOR^c$, $CO-NR^cR^d$, $C_1$-$C_{30}$-alkyl $C_3$-$C_{12}$-cycloalkyl, $C_2$-$C_{30}$-alkenyl, $C_3$-$C_{12}$-cycloalkenyl, aryl or heteroaryl, wherein the latter 6 moieties may comprise one or more halogenic moiety and/or one to three moieties selected out of the group consisting of $C_1$-$C_6$-alkyl, aryl, heteroaryl, $C_3$-$C_7$-cycloalkyl, halogen, $OR^c$, $SR^c$, $NR^cR^d$, $COR^c$, $COOR^c$, $CO-NR^cR^d$, wherein $R^c$ and $R^d$ may be, independently of each other, hydrogen, $C_1$-$C_6$-alkyl, $C_1$-$C_6$-halogenalkyl, cyclopentyl, cyclohexyl, phenyl, tolyl or benzyl.

Two neighboring moieties of the moieties R, $R^4$, $R^5$, $R^6$, $R^7$ and $R^8$ may form, together with an atom to which they are bound, a ring which may be unsaturated or aromatic, unsaturated or saturated, wherein the chain formed by the respective moieties may be interrupted by one or more hetero-atoms out of the group consisting of O, S, NH or N—$C_1$-$C_4$-alkyl.

$R^e$, $R^f$, $R^g$, and $R^h$ may be, independently of each other, hydrogen, $C_1$-$C_6$-alkyl, aryl-, heteroaryl-, $C_3$-$C_7$-cycloalkyl, halogen, $OR^c$, $SR^c$, $NR^cR^d$, $COOR^c$, $CO-NR^cR^d$ or $COR^c$, wherein $R^c$ and $R^d$, may be, independently of each other, hydrogen, $C_1$-$C_6$-alkyl, $C_1$-$C_6$-halogenalkyl, cyclopentyl, cyclohexyl, phenyl, tolyl or benzyl; such as hydrogen, halogen, and $C_1$-$C_6$-alkyl, or hydrogen and $C_1$-$C_6$-alkyl.

The ionic liquid that may be part of the sorbant fluid or may even form the main component of the sorbant fluid and may be designed according to specific needs. In general the ionic liquid may satisfy the generic formula $([A]^+_a[B]^{a-}$, wherein $[A]^+$ is one out of the group consisting of quaternary ammonium cation $[R^1R^{1'}R^2R^3N]^+$, phosphonium cation $[R^1R^{1'}R^2R^3P]^+$, sulfonium cation $[R^1R^{1'}R^2S]^+$, a hetero aromatic cation and guanidinium cation $R^3R^{3'}N(C=NR^1R^{1'})NR^2R^{2'}$, such as:

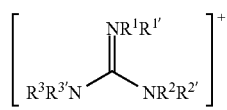

In case of the quaternary ammonium $[R^1R^{1'}R^2R^3N]^+$, phosphonium $[R^1R^{1'}R^2R^3P]^+$ or sulfonium $[R^1R^{1'}R^2]^+$ cation, $R^1$, $R^{1'}$, $R^2$, and $R^3$ may be hydrogen or alkyl, alkenyl, alkinyl, cycloalkyl, cycloalkenyl, aryl or heteroaryl which may be independently substituted.

Two of the moieties $R^1$, $R^{1'}$, $R^2$, and $R^3$ may form a ring together with a hetero-atom to which they are bound. The ring may be saturated, unsaturated, substituted or unsubstituted. The chain may be interrupted by one or more hetero-atoms out of the group consisting of O, S, NH or N—$C_1$-$C_4$-alkyl.

In case of the guanidinium $R^3R^{3'}N(C=NR^1R^{1'})NR^2R^{2'}$ cation, $R^1$, $R^{1'}$, $R^2$, $R^{2'}$, $R^3$, $R^{3'}$ may be hydrogen or alkyl, alkenyl, alkinyl, cycloalkyl, cycloalkenyl, aryl or heteroaryl which may be independently substituted. Two of the moieties $R^1$, $R^{1'}$, $R^2$, $R^{2'}R^3$, $R^{3'}$, may form a ring without or together with a hetero-atom to which they are bound. The ring may be saturated, unsaturated, substituted or unsubstituted. The chain may be interrupted by one or more hetero-atoms out of the group consisting of O, S, NH or N—$C_1$-$C_4$-alkyl.

Two of the moieties $R^1$, $R^{1'}$, $R^2$, $R^3$ may form a ring together with a hetero-atom to which they are bound. The ring may be saturated, unsaturated, substituted or unsubstituted. The chain may be interrupted by one or more hetero-atoms out of the group consisting of O, S, NH or N—$C_1$-$C_4$-alkyl.

$[B]^{a-}$ may be an arbitrarily chosen anion having negative charge a.

The cation $[A]^+$ may be a hetero aromatic cation and may form a five- or six-membered ring comprising at least one N and if necessary one O and/or one S. The hetero aromatic cation may be substituted, unsubstituted, and/or annelated.

The hetero aromatic cation may be selected from the group consisting of:

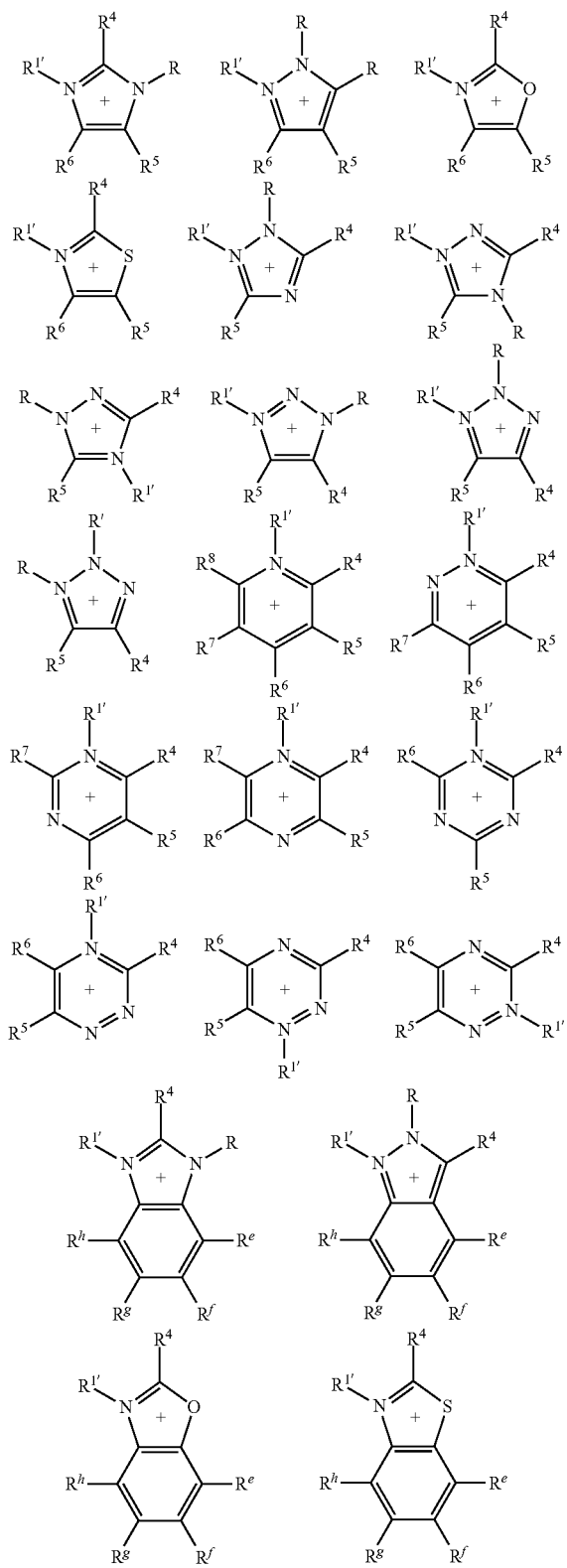

wherein the moieties R may be one of the following: hydrogen, $C_1$-$C_{30}$-alkyl, $C_3$-$C_{12}$-cycloalkyl, $C_2$-$C_{30}$-alkenyl, $C_3$-$C_{12}$-cycloalkenyl, $C_2$-$C_{30}$-alkinyl, aryl or heteroaryl, wherein the latter seven moieties may have one or more halogenic moiety and/or one to three moieties selected from the group consisting of $C_1$-$C_6$-alkyl, aryl, heteroaryl, $C_3$-$C_7$-cycloalkyl, halogen, $OR^c$, $SR^c$, $NR^cR^d$, $COR^c$, $COOR^c$, CO—$NR^cR^d$.

$R^c$ and $R^d$ may be hydrogen, $C_1$-$C_6$-alkyl, $C_1$-$C_6$-halogenalkyl, cyclopentyl, cyclohexyl, phenyl, tolyl or benzyl.

$R^1$, $R^{1'}$, $R^2$, and $R^3$ may be hydrogen, alkyl, alkenyl, alkinyl, cycloalkyl, cycloalkenyl, aryl or heteroaryl which may be independently substituted.

Two of the moieties $R^1$, $R^{1'}$, $R^2$, and $R^3$ may form a ring together with a hetero-atom to which they are bound. The ring may be saturated, unsaturated, substituted or unsubstituted. The chain may be interrupted by one or more hetero-atoms out of the group consisting of O, S, NH or N—$C_1$-$C_4$-alkyl.

$R^4$, $R^5$, $R^6$, $R^7$ and $R^8$ may be, independently of each other, hydrogen, halogen, nitro, cyano, $OR^c$, $SR^C$, $NR^cR^d$, $COR^c$, $COOR^c$, CO—$NR^cR^d$, $C_1$-$C_{30}$-alkyl, $C_3$-$C_{12}$-cycloalkyl, $C_2$-$C_{30}$-alkenyl, $C_3$-$C_{12}$-cycloalkenyl, aryl or heteroaryl, wherein the latter six moieties may comprise one or more halogenic moiety and/or one to three moieties selected out of the group consisting of $C_1$-$C_6$-alkyl, aryl, heteroaryl, $C_3$-$C_7$-cycloalkyl, halogen, $OR^c$, $SR^c$, $NR^cR^d$, $COR^c$, $COOR^c$, CO—$NR^cR^d$, wherein $R^c$ and $R^d$ may be, independently of each other, hydrogen, $C_1$-$C_6$-alkyl, $C_1$-$C_6$-halogenalkyl, cyclopentyl, cyclohexyl, phenyl, tolyl or benzyl.

Two neighboring moieties of the moieties R, $R^4$, $R^5$, $R^6$, $R^7$ and $R^8$ may form, together with an atom to which they are bound, a ring which may be aromatic, unsaturated or saturated, wherein the chain formed by the respective moieties may be interrupted by one or more hetero-atoms out of the group consisting of O, S, NH or N—$C_1$-$C_4$-alkyl.

$R^e$, $R^f$, $R^g$, and $R^h$ may be, independently of each other, hydrogen, $C_1$-$C_6$-alkyl, aryl-, heteroaryl-, $C_3$-$C_7$-cycloalkyl, halogen, $OR^c$, $SR^c$, $NR^cR^d$, $COOR^c$, CO—$NR^cR^d$ or $COR^c$, wherein $R^c$ and $R^d$, may be, independently of each other, hydrogen, $C_1$-$C_6$-alkyl, $C_1$-$C_6$-halogenalkyl, cyclopentyl, cyclohexyl, phenyl, tolyl or benzyl, such as hydrogen, halogen, $C_1$-$C_6$-alkyl, or hydrogen and $C_1$-$C_6$-alkyl.

Cations may be selected out of the group consisting of: mono-, di-, tri-, or tetra-alkyl-ammonium, mono-, di-, tri-, or tetra-alkylphosphonium, trialkylbenzylammonium, with one to four independent $C_1$ to $C_6$-alkyl chains; 1,3-dialkylimidazolium, 1,2,3-trialkylimidazolium, N-alkylpyridinium, N,N-dialkylpiperidinium, N,N-dialkylmorpholinium, N,N-dialkylpyrrolidinium with one or two independent $C_1$ to $C_6$-alkyl chains; and mono-, di-, tri-, tetra-, penta- or hexa-alkylguanidinium, with one to six independent $C_1$ to $C_6$-alkyl chains, which may be substituted with one or more hydroxy- or alkoxy-groups, or 2-Hydroxyethyltrimethylammonium (Choline), 2-Acetoxyethyl-trimethylammonium (Acetylcholine) or Guanidinium (protonated Guanidine, CAS 113-00-8).

$[B]^{a-}$ may be: fluoride; chloride; bromide; iodide; thiocyanate; dicyanamide; chlorate; perchlorate; hexafluorophosphate; hexafluoroarsenate; hexafluoroantimonate; trifluoroarsenate; nitrite; nitrate; sulfate; hydrogen sulfate; carbonate; hydrogen carbonate; alkylcarbonate; arylcarbonate; phosphate; hydrogen phosphate; dihydrogen phosphate; phosphonate $HPO_3^{2-}$; hydrogen phosphonate $H_2PO_3^-$; sulfamate $H_2N$—$SO_3^-$, deprotonated acesulfame (6-methyl-2,2-dioxo-oxathiazin-4-olate), deprotonated saccharine (1,1-Dioxo-3-one-1,2-benzothiazolate), cyclamate (deprotonated cyclohexanesulfamic acid), tetra-substituted borate of the generic form (Va) $[BR^iR^jR^kR^l]^-$, wherein $R^i$ to $R^l$ may be, independently of each other, fluorine or an organic, inorganic, acyclic, cyclic, aliphatic, aromatic or araliphatic moiety comprising carbon having one to thirty (30) carbon atoms, which may comprise one or more heteroatoms and/or which may be substituted by one or more functional groups or halogen;

organic sulfonate of the generic form (Vb) [$R^m$—$SO_3$]$^-$, wherein $R^m$ may be, one or more organic, saturated, unsaturated, acyclic, cyclic, aliphatic, aromatic or araliphatic moiety comprising carbon having one to thirty (30) carbon atoms, which may comprise one or more heteroatoms and/or which may be substituted by one or more functional groups or halogen;

organic sulfate of the generic form (Vc) [$R^m$—$OSO_3$]$^-$, wherein $R^m$ may be one organic, saturated, unsaturated, acyclic, cyclic, aliphatic, aromatic or araliphatic moiety comprising carbon having one to thirty (30) carbon atoms, which may comprise one or more heteroatoms and/or which may be substituted by one or more functional groups or halogen;

carboxylate of the generic form (Vd) [$R^n$—COO]$^-$, wherein $R^n$ may be one organic, saturated, unsaturated, acyclic, cyclic, aliphatic, aromatic or araliphatic moiety comprising carbon or hydrogen and having one to thirty (30) carbon atoms, which may comprise one or more heteroatoms and/or which may be substituted by one or more functional groups or halogen;

(fluoroalkyl)fluorophosphate of the generic form (Ve) [$PF_x(C_yF_{2y+1-z}H_z)_{6-x}$]$^-$, wherein $1 \leq x \leq 6$, $1 \leq y \leq 8$ and $0 \leq z \leq 2y+1$; or imide of the generic form (Vf) [$R^o$—$SO_2$—N—$SO_2$—$R^p$]$^-$, (Vg) [$R^r$—$SO_2$—N—CO—$R^s$]$^-$ or (Vh) [$R^t$—CO—N—CO—$R^u$]$^-$, wherein $R^o$ to $R^u$ may be, independently of each other, an organic, saturated, unsaturated, acyclic, cyclic, aliphatic, aromatic or araliphatic moiety comprising carbon or hydrogen and having one to thirty (30) carbon atoms, which may comprise one or more heteroatoms and/or which may be substituted by one or more functional groups or halogen.

Organic phosphate of the generic form (Vi) [$R^m$—$OPO_3$]$^{2-}$ or (Vj) [$R^m$—$OPO_2$—$OR^n$]$^-$ wherein $R^m$ may be an organic, saturated, unsaturated, acyclic, cyclic, aliphatic, aromatic or araliphatic moiety comprising carbon and having one to thirty (30) carbon atoms, which may comprise one or more heteroatoms and/or which may be substituted by one or more functional groups or halogen, and wherein $R^n$ may be hydrogen or an organic, saturated, unsaturated, acyclic, cyclic, aliphatic, aromatic or araliphatic moiety comprising carbon or hydrogen and having one to thirty (30) carbon atoms, which may comprise one or more heteroatoms and/or which may be substituted by one or more functional groups or halogen.

Organic phosphonate of the generic form (Vk) [$R^m$—$PO_3$]$^{2-}$ or (Vl) [$R^m$—$PO_3$—$R^n$]$^-$ wherein $R^m$ may be an organic, saturated, unsaturated, acyclic, cyclic, aliphatic, aromatic or araliphatic moiety comprising carbon and having one to thirty (30) carbon atoms, which moiety may comprise one or more heteroatoms and/or which may be substituted by one or more functional groups or halogen, and wherein $R^n$ may be hydrogen or an organic, saturated, unsaturated, acyclic, cyclic, aliphatic, aromatic or araliphatic moiety comprising carbon or hydrogen and having one to thirty (30) carbon atoms, which may comprise one or more heteroatoms and/or which may be substituted by one or more functional groups or halogen.

The charge "a−" of the anion [B]$^{a-}$ may be "1−", "2−" or "3−". Examples of anions having a double negative charge may be sulfate, hydrogen phosphate and carbonate while an example for anions having a triple negative charge may be phosphate.

The moieties $R^i$ to $R^l$ in the tetra-substituted borate (Va), the moiety $R^m$ of the organic sulfonate (Vb) and the organic sulfate (Vc), the moiety $R^n$ of the carboxylate (Vd), the moieties $R^o$ to $R^u$ of the imides (Vf), (Vg) and (Vh), the moieties $R^m$ and $R^n$ of the phosphates (Vi) and (Vj), the moieties $R^m$ and $R^n$ of the phosphonates (Vk) and (Vl) may be, independently of each other, organic, saturated, unsaturated, acyclic, cyclic, aliphatic, aromatic or araliphatic moieties comprising carbon and having one to thirty (30) carbon atoms: $C_1$- to $C_{30}$-alkyl and the respective aryl-, heteroaryl-, cycloalkyl-, halogen-, hydroxy-, amino-, carboxy-, formyl-, —O—, —CO—, —CO—O— or —CO—N substituted components, for example, methyl, ethyl, 1-propyl, 2-propyl, 1-butyl, 2-butyl, 2-methyl-1-propyl (isobutyl), 2-methyl-2-propyl (tertbutyl), 1-pentyl, 2-pentyl, 3-pentyl, 2-methyl-1-butyl, 3-methyl-1-butyl, 2-methyl-2-butyl, 3-methyl-2-butyl, 2,2-dimethyl-1-propyl, 1-hexyl, 2-hexyl, 3-hexyl, 2-methyl-1-pentyl, 3-methyl-1-pentyl, 4-methyl-1-pentyl, 2-methyl-2-pentyl, 3-methyl-2-pentyl, 4-methyl-2-pentyl, 2-methyl-3-pentyl, 3-methyl-3-pentyl, 2,2-dimethyl-1-butyl, 2,3-dimethyl-1-butyl, 3,3-dimethyl-1-butyl, 2-ethyl-1-butyl, 2,3-dimethyl-2-butyl, 3,3-dimethyl-2-butyl, heptyl, octyl, nonyl, decyl, undecyl, dodecyl, tridecyl, tetradecyl, pentadecyl, hexadecyl, heptadecyl, octadecyl, nonadecyl, icosyl, henicosyl, docosyl, tricosyl, tetracosyl, pentacosyl, hexacosyl, heptacosyl, octacosyl, nonacosyl, triacontyl, phenylmethyl (benzyl), diphenylmethyl, triphenylmethyl, 2-phenylethyl, 3-phenylpropyl, cyclopentylmethyl, 2-cyclopentylethyl, 3-cyclopentylpropyl, cyclohexylmethyl, 2-cyclohexylethyl, 3-cyclohexylpropyl, methoxy, ethoxy, formyl, acetyl or $C_nF_{2(n-a)+(1-b)}H_{2a+b}$ wherein $n \leq 30$, $0 \leq a \leq n$ and $b=0$ or 1 (e.g. $CF_3$, $C_2F_5$, $CH_2CH_2$—$C_{(n-2)})F_{2(n-2)+1}$, $C_6F_{13}$, $C_8F_{17}$, $C_{10}F_{21}$, $C_{12}F_{25}$), $C_3$- to $C_{12}$-cycloalkyl and the respective aryl-, heteroaryl-, cycloalkyl-, halogen-, hydroxy-, amino-, carboxy-, formyl-, —O—, —CO— or —CO—O-substituted components (e.g. cyclopentyl, 2-methyl-1-cyclopentyl, 3-methyl-1-cyclopentyl, cyclohexyl, 2-methyl-1-cyclohexyl, 3-methyl-1-cyclohexyl, 4-methyl-1-cyclohexyl or $C_{nF2(n-a)-(1-b)}H_{2a-b}$ wherein $n-30$, $0 \leq a \leq n$ and $b=0$ or 1);

$C_2$- to $C_{30}$-alkenyl and the respective aryl-, heteroaryl-, cycloalkyl-, halogen-, hydroxyl-, amino-, carboxy-, formyl-, —O—, —CO— or —CO—O— substituted components (e.g. 2-propenyl, 3-butenyl, cis-2-butenyl, trans-2-butenyl or $C_nF_{2(n-a)-(1-b)}H_{2a-b}$ wherein $n \leq 30$, $0 \leq a \leq n$ and $b=0$ or 1);

$C_3$- to $C_{12}$-cycloalkenyl and the respective aryl-, heteroaryl-, cycloalkyl-, halogen-, hydroxy-, amino-, carboxy-, formyl-, —O—, —CO— or —CO—O— substituted components (e.g. 3-cyclopentenyl, 2-cyclohexenyl, 3-cyclohexenyl, 2,5-cyclohexadienyl or $C_nF_{2(n-a)-3(1-b)}H_{2a-3b}$ wherein $n \leq 30$, $0 \leq a \leq n$ and $b=0$ or 1); and aryl or heteroaryl having two to thirty (30) carbon atoms and the respective alkyl-, aryl-, heteroaryl-, cycloalkyl-, halogen-, hydroxy-, amino-, carboxy-, formyl-, —O—, —CO— or —CO—O— substituted components (e.g. phenyl, 2-methyl-phenyl (2-tolyl), 3-methyl-phenyl (3-tolyl), 4-methyl-phenyl, 2-ethyl-phenyl, 3-ethyl-phenyl, 4-ethyl-phenyl, 2,3-dimethyl-phenyl, 2,4-dimethyl-phenyl, 2,5-dimethyl-phenyl, 2,6-dimethyl-phenyl, 3,4-dimethyl-phenyl, 3,5-dimethyl-phenyl, 4-phenyl-phenyl, 1-naphthyl, 2-naphthyl, 1-pyrrolyl, 2-pyrrolyl, 3-pyrrolyl, 2-pyridinyl, 3-pyridinyl, 4-pyridinyl or $C_6F_{(5-a)}H_a$ wherein $0 \leq a \leq 5$).

In the case that the anion [B]$^{a-}$ is a tetra-substituted borate (Va) [$BR^iR^jR^kR^l$]$^-$, all four moieties $R^i$ to $R^l$ may be identical and include fluoro, such as trifluoromethyl, pentafluoroethylphenyl, 3,5-bis(trifluoromethyl)phenyl. Tetra-substituted borate (Va) may be tetrafluoroborate, tetraphenylborate and tetra[3,5-bis(trifluoromethyl)phenyl]borate.

In case that the anion [B]$^{a-}$ is an organic sulfonate (Vb) [$R^m$—$SO_3$]$^-$ or sulfate (Vc) [$R^m$—$OSO_3$]$^-$ the moiety $R^m$ may be unbranched or branched $C_1$- to $C_{12}$-alkyl, unbranched or branched $C_1$- to $C_{12}$-mono-, di-, tri- or polyhydroxy-alkyl, trifluoromethyl, pentafluoroethyl, p-tolyl, phenyl, aminophenyl, naphthyl, aminonaphthyl or $C_9F_{19}$. Organic sulfonates (Vb) may be trifluoromethanesulfonate (triflate), methanesulfonate, nonadecafluorononansulfonate (nonaflate) and p-toluolsulfonate; while organic sulfates (Vc) may be methylsulfate, ethylsulfate, n-propylsulfate, i-propylsulfate, butylsulfate, pentylsulfate, hexylsulfate, heptylsulfate, octylsulfate, nonylsulfate and decylsulfate as well as long-chain ("fatty") n-alkylsulfate; benzylsulfate, and alkylarlysulfate.

In case that the anion $[B]^{a-}$ is a carboxylate (Vd) $[R^n—COO]—$, the moiety $R^n$ may be hydrogen, methyl, trifluoromethyl, pentafluoroethyl, phenyl, carboxy-phenyl (protonated or deprotonated), hydroxyphenyl-methyl, trichloromethyl, dichloromethyl, chloromethyl, trifluoromethyl, difluoromethyl, fluoromethyl, unbranched or branched $C_1$- to $C_{12}$-alkyl, unbranched or branched $C_1$- to $C_{12}$-mono-, di-, tri- or polyhydroxy-alkyl, unbranched or branched $C_1$- to $C_{12}$-mono-, di-, tri- or polycarboxy-alkyl (with fully deprotonated, partially deprotonated or fully protonated carboxy groups), unbranched or branched $C_1$- to $C_{12}$-mono-, di-, tri- or polycarboxy-hydroxyalkyl (with fully deprotonated, partially deprotonated or fully protonated carboxy groups), unbranched or branched $C_1$— to $C_{12}$-mono-, di-, tri- or polycarboxy-dihydroxy-alkyl (with fully deprotonated, partially deprotonated or fully protonated carboxy groups), unbranched or branched $C_1$- to $C_{12}$-mono-, di-, tri- or polycarboxy-trihydroxy-alkyl (with fully deprotonated, partially deprotonated or fully protonated carboxy groups), unbranched or branched $C_1$- to $C_{12}$-mono-, di-, tri- or polycarboxy-polyhydroxy-alkyl (with fully deprotonated, partially deprotonated or fully protonated carboxy groups), unbranched or branched $C_1$- to $C_{12}$-alkenyl, unbranched or branched $C_1$- to $C_{12}$-mono-, di-, tri- or polyhydroxy-alkenyl, unbranched or branched $C_1$- to $C_{12}$-mono-, di-, tri- or polycarboxy-alkenyl (with fully deprotonated, partially deprotonated or fully protonated carboxy groups), unbranched or branched $C_1$- to $C_{12}$-mono-, di-, tri- or polycarboxy-hydroxy-alkenyl (with fully deprotonated, partially deprotonated or fully protonated carboxy groups), unbranched or branched $C_1$- to $C_{12}$-mono-, di-, tri- or polycarboxy-dihydroxy-alkenyl (with fully deprotonated, partially deprotonated or fully protonated carboxy groups), unbranched or branched $C_1$- to $C_{12}$-mono-, di-, tri- or polycarboxy-trihydroxy-alkenyl (with fully deprotonated, partially deprotonated or fully protonated carboxy groups), unbranched or branched $C_1$- to $C_{12}$-mono-, di-, tri- or polycarboxy-polyhydroxy-alkenyl (with fully deprotonated, partially deprotonated or fully protonated carboxy groups). $R^n$ may be methyl, ethyl, 1-propyl, 2-propyl, 1-butyl, 2-butyl, 2-methyl-1-propyl (isobutyl), 2-methyl-2-propyl (tert-butyl), 1-pentyl, 2-pentyl, 3-pentyl, 2-methyl-1-butyl, 3-methyl-1-butyl, 2-methyl-2-butyl, 3-methyl-2-butyl, 2,2-dimethyl-1-propyl, 1-hexyl, 2-hexyl, 3-hexyl, 2-methyl-1-pentyl, 3-methyl-1-pentyl, 4-methyl-1-pentyl, 2-methyl-2-pentyl, 3-methyl-2-pentyl, 4-methyl-2-pentyl, 2-methyl-3-pentyl, 3-methyl-3-pentyl, 2,2-dimethyl-1-butyl, 2,3-dimethyl-1-butyl, 3,3-dimethyl-1-butyl, 2-ethyl-1-butyl, 2,3-dimethyl-2-butyl, 3,3-dimethyl-2-butyl, heptyl, octyl, nonyl, decyl, undecyl or dodecyl). Carboxylate (Vd) may be trichloroacetate, dichloroacetate, chloroacetate, trifluoroacetate, difluoroacetate, fluoroacetate, methoxyacetate, cyanacetate, glykolate, benzoate, pyruvate, malonate, pivalate and the deprotonated or partially deprotonated form of the following monovalent or polyvalent acids: formic acid; acetic acid; propionic acid; butyric acid; valeric acid; caproic acid; enanthic acid; caprylic acid; capric acid; lauric acid; myristic acid; palmitic acid; stearic acid; arachidic acid; O-acetylsalicylic acid; sorbic acid; pivalic acid; fatty acids; amino acids (e.g. isoleucine, alanine, leucine, asparagine, lysine, aspartic acid, methionine, cysteine, phenylalanine, glutamic acid, threonine, glutamine, tryptophan, glycine, valine, proline, serine, tyrosine, arginine, histidine, ornithine, taurine, sulfamic acid); sugar acids (linear or cyclic form) (e.g. aldonic acids, $(HOOC—(CHOH)_n—CH_2OH$, n=1 to 4); ulosonic acids; uronic acids; aldaric acids $(HOOC—(CHOH)_n—COOH$, n=1 to 4); gluconic acid; glucuronic acid; mannonic acid; mannuronic acid; galactonic acid; galacturonic acid; ascorbic acid; glyceric acid; xylonic acid; neuraminic acid; iduronic acid; dicarboxylic acids (e.g. oxalic acid, malonic acid, succinic acid, glutaric acid, adipic acid, pimelic acid, suberic acid, azelaic acid, sebacic acid, phthalic acid, isophthalic acid, terephthalic acid, maleic acid, fumaric acid, glutaconic acid, traumatic acid, muconic acid); tricarboxylic acids (e.g. citric acid, isocitric acid, aconitic acid, propane-1,2,3-tricarboxylic acid, trimesic acid); hydroxy-carboxylic acids (e.g. glycolic acid, lactic acid, malic acid, citric acid, tartaric acid, mandelic acid, 2-hydroxybutyric acid, 3-hydroxybutyric acid, 4-hydroxybutyric acid, 3-hydroxypropionic acid, 3-hydroxyisovaleric acid, salicylic acid); and polycarboxylic acids.

In case that the anion $[B]^{a-}$ is a (fluoroalkyl)fluorophosphate (Ve) $[PF_x(C_yF_{2y+1-z}H_z)_{6-x}]—$, z may be 0. The (Fluoroalkyl)fluorophosphates (Ve) may be (Ve) wherein z=0, x=3 and $1 \leq y \leq 4$, such as $[PF_3(CF_3)_3]$, $[PF_3(C_2F_5)_3]^-$, $[PF_3(C_3F_7)_3]^-$ and $[PF_3(C_4F_7)_3]^-$.

In case that the anion $[B]^{a-}$ is an imide (Vf) $[R^o—SO_2—N—SO_2—R^p]^-$, (Vg) $[R^r—SO_2—N—CO—R^s]^-$ or (Vh) $(R^t—CO—N—CO—R^u]$ the moieties $R^o$ to $R^u$ may be, independently of each other, preferably hydrogen, trifluoromethyl, pentafluoroethyl, phenyl, trichloromethyl, dichloromethyl, chloromethyl, trifluoromethyl, difluoromethyl, fluoromethyl or unbranched or branched $C_1$- to $C_{12}$-alkyl (e.g. methyl, ethyl, 1-propyl, 2-propyl, 1-butyl, 2-butyl, 2-methyl-1-propyl (isobutyl), 2-methyl-2-propyl (tert-butyl), 1-pentyl, 2-pentyl, 3-pentyl, 2-methyl-1-butyl, 3-methyl-1-butyl, 2-methyl-2-butyl, 3-methyl-2-butyl, 2,2-dimethyl-1-propyl, 1-hexyl, 2-hexyl, 3-hexyl, 2-methyl-1-pentyl, 3-methyl-1-pentyl, 4-methyl-1-pentyl, 2-methyl-2-pentyl, 3-methyl-2-pentyl, 4-methyl-2-pentyl, 2-methyl-3-pentyl, 3-methyl-3-pentyl, 2,2-dimethyl-1-butyl, 2,3-dimethyl-1-butyl, 3,3-dimethyl-1-butyl, 2-ethyl-1-butyl, 2,3-dimethyl-2-butyl, 3,3-dimethyl-2-butyl, heptyl, octyl, nonyl, decyl, undecyl or dodecyl). Imides (Vf), (Vg) and (Vh) may be $[F_3C—SO_2—N—SO_2—CF_3]^-$, $[F_3C—SO_2—N—CO—CF_3]^-$, $[F_3C—CO—N—CO—CF_3]^-$ and those wherein the moieties $R^o$ to $R^u$ may be, independently of each other, hydrogen, methyl, ethyl, propyl, butyl, phenyl, trichloromethyl, dichloromethyl, chloromethyl, trifluoromethyl, difluoromethyl or fluoromethyl.

In case that the anion $[B]^{a-}$ is a phosphate (Vi) $[R^m—OPO_3]^{2-}$ or (Vj) $[R^m—OPO_3R^n]^-$ the moieties $R^m$ and/or $R^n$ may be independently from each other preferably hydrogen, trifluoromethyl, pentafluoroethyl, phenyl, hydroxy-phenylmethyl, trichloromethyl, dichloromethyl, chloromethyl, trifluoromethyl, difluoromethyl, fluoromethyl or unbranched or branched $C_1$- to $C_{12}$-alkyl, unbranched or branched $C_1$- to $C_{12}$-mono-, di-, tri- or polyhydroxy-alkyl (e.g. methyl, ethyl, 1-propyl, 2-propyl, 1-butyl, 2-butyl, 2-methyl-1-propyl (isobutyl), 2-methyl-2-propyl (tert-butyl), 1-pentyl, 2-pentyl, 3-pentyl, 2-methyl-1-butyl, 3-methyl-1-butyl, 2-methyl-2-butyl, 3-methyl-2-butyl, 2,2-dimethyl-1-propyl, 1-hexyl, 2-hexyl, 3-hexyl, 2-methyl-1-pentyl, 3-methyl-1-pentyl, 4-methyl-1-pentyl, 2-methyl-2-pentyl, 3-methyl-2-pentyl, 4-methyl-2-pentyl, 2-methyl-3-pentyl, 3-methyl-3-pentyl, 2,2-dimethyl-1-butyl, 2,3-dimethyl-1-butyl, 3,3-dimethyl-1-butyl, 2-ethyl-1,2,3-dimethyl-2-butyl, 3,3-dimethyl-2-butyl, heptyl, octyl, nonyl, decyl, undecyl or dodecyl). Phosphates (Vi) or (Vj) may be $C_1$ to $C_{18}$ n-alkylphosphates and $C_1$ to $C_{18}$ di-n-alkylphosphates, e.g. dimethylphosphate, diethylphosphate, dibutylphosphate.

In case that the anion $[B]^{a-}$ is a phosphonate (Vk) $[R^m—PO_3]^{2-}$ or (Vl) $[R^m—PO_3R^n]^-$ the moieties $R^m$ and/or $R^n$ may be independently from each other preferably hydrogen, trifluoromethyl, pentafluoroethyl, phenyl, hydroxy-phenyl-methyl, trichloromethyl, dichloromethyl, chloromethyl, trifluoromethyl, difluoromethyl, fluoromethyl or unbranched or branched $C_1$- to $C_{12}$-alkyl, unbranched or branched $C_1$- to $C_{12}$-mono-, di-, tri- or polyhydroxy-alkyl (e.g. methyl, ethyl, 1-propyl, 2-propyl, 1-butyl, 2-butyl, 2-methyl-1-propyl (isobutyl), 2-methyl-2-propyl (tert-butyl), 1-pentyl, 2-pentyl, 3-pentyl, 2-methyl-1-butyl, 3-methyl-1-butyl, 2-methyl-2-butyl, 3-methyl-2-butyl, 2,2-dimethyl-1-propyl, 1-hexyl, 2-hexyl, 3-hexyl, 2-methyl-1-pentyl, 3-methyl-1-pentyl, 4-methyl-1-pentyl, 2-methyl-2-pentyl, 3-methyl-2-pentyl, 4-methyl-2-pentyl, 2-methyl-3-pentyl, 3-methyl-3-pentyl, 2,2-dimethyl-1-butyl, 2,3-dimethyl-1-butyl, 3,3-dimethyl-1-butyl, 2-ethyl-1-butyl, 2,3-dimethyl-2-butyl, 3,3-dimethyl-2-butyl, heptyl, octyl, nonyl, decyl, undecyl or dodecyl). Phosponates (Vk) or (Vl) may be $C_1$ to $C_{18}$ n-alkylphosphonates and $C_1$ to $C_{18}$ di-n-alkyl phosphonates, e.g. dimethyl phosphonate (diethyl phosphonate, dibutyl phosphonate).

The following cations and anions may be combined with each other to form the ionic liquids as components for the desiccant liquid:

Cations

Tetramethylammonium, tetraethylammonium, tetrabutylammonium tetrahexylammonium, tetraoctylammonium, trimethylammonium, triethylammonium, tributylammonium, triethylmethylammonium, tributylmethylammonium, trihexylmethylammonium, trioctylmethylammonium, tris-(2-Hydroxyethyl)methylammonium, tris-(2-Hydroxyethyl)ethylammonium, bis-(2-hydroxyethyl)dimethylammonium, 1,3-dimethylimidazolium, 1-ethyl-3-methylimidazolium, 1-propyl-3-methylimidazolium, 1-butyl-3-methylimidazolium, 1,2,3-trimethylimidazolium, 1,3-diethylimidazolium, 1,3-dibutylimidazolium, 1-ethyl-2,3-dimethylimidazolium, 1-butyl-2,3-dimethylimidazolium, 1-(2-hydroxyethyl)-3-methylimidazolium, 1-(3-hydroxypropyl)-3-methylimidazolium, 1-(2-hydroxypropyl)-3-methylimidazolium, 1-(4-hydroxy-butyl)-3-methylimidazolium, 1-(3-hydroxy-butyl)-3-methylimidazolium, 1-(2-hydroxy-butyl)-3-methylimidazolium, 1-(2-methoxyethyl)-3-methylimidazolium, 1-(3-methoxypropyl)-3-methylimidazolium, 1-(2-methoxypropyl)-3-methyl imidazolium, 1-(4-methoxy-butyl)-3-methylimidazolium, 1-(3-methoxy-butyl)-3-methylimidazolium, 1-(2-methoxy-butyl)-3-methylimidazolium, 1-(2-ethoxyethyl)-3-methylimidazolium, 1-(3-ethoxypropyl)-3-methylimidazolium, 1-(2-ethoxypropyl)-3-methylimidazolium, 1-(4-ethoxy-butyl)-3-methylimidazolium, 1-(3-ethoxy-butyl)-3-methylimidazolium, 1-(2-ethoxy-butyl)-3-methylimidazolium, 1-allyl-3-methylimidazolium, 1-allyl-2,3-dimethylimidazolium, N,N-dimethylmorpholinium, N,N-diethylmorpholinium, N,N-dibutylmorpholinium, N-ethyl-N-methylmorpholinium, N-butyl-N-methylmorpholinium, N,N-dimethylpiperidinium, N,N-diethylpiperidinium, N,N-dibutylpiperidinium, N-ethyl-N-methylpiperidinium, N-butyl-N-methylpiperidinium, N,N-dimethylpyrrolidinium, N,N-diethylpyrrolidinium, N,N-dibutylpyrrolidinium, N-ethyl-N-methylpyrrolidinium, N-butyl-N-methylpyrrolidinium, 2-Hydroxyethyltrimethylammonium (choline), 2-acetoxyethyl-trimethylammonium (acetylcholine), guanidinium (protonated guanidine, CAS 113-00-8), tetramethylguanidinium, pentamethylguanidinium, hexamethylguanidinium, triethylmethylphosphonium, tripropylmethylphosphonium, tributylmethylphosphonium, tetraethylphosphonium, tetrapropylphosphonium, tetrabutylphosphonium, tetramethylphosphonium.

Anions

Acetate, fluoride, chloride, thiocyanate, dicyanamide, chlorate, perchlorate, nitrite, nitrate, sulfate, hydrogensulfate, carbonate, hydrogencarbonate, methylcarbonate, phosphate, hydrogenphosphate, dihydrogenphosphate, phosphonate $HPO_3^{2-}$, hydrogenphosphonate $H_2PO^{3-}$, sulfamate $H_2N—SO^{3-}$, deprotonated acesulfame (6-methyl-2,2-dioxo-oxathiazin-4-olate), deprotonated saccharine (1,1-Dioxo-3-one-1,2-benzothiazolate), cyclamate (deprotonated cyclohexanesulfamic acid), tetrafluoroborate, trifluoromethanesulfonate (triflate), methanesulfonate, nonadecafluoro-nonansulfonate (nonaflate) and p-toluolsulfonate, methylsulfate, ethylsulfate, n-propylsulfate, i-propylsulfate, butylsulfate, pentylsulfate, hexylsulfate, heptylsulfate, octylsulfate, nonylsulfate, decylsulfate, long-chain ("fatty") n-alkylsulfate, benzylsulfate, trichloroacetate, dichloroacetate, chloroacetate, trifluoroacetate, difluoroacetate, fluoroacetate, methoxyacetate, cyanacetate, glykolate, benzoate, pyruvate, malonate, pivalate, the deprotonated or partially deprotonated form of the following monovalent or polyvalent acids: formic acid; acetic acid; propionic acid; butyric acid; valeric acid; caproic acid; enanthic acid; caprylic acid; capric acid; lauric acid; myristic acid; palmitic acid; stearic acid; arachidic acid; O-acetylsalicylic acid; sorbic acid; pivalic acid; fatty acids; amino acids (e.g. isoleucine, alanine, leucine, asparagine, lysine, aspartic acid, methionine, cysteine, phenylalanine, glutamic acid, threonine, glutamine, tryptophan, glycine, valine, proline, serine, tyrosine, arginine, histidine, ornithine, taurine, sulfamic acid); linear or cyclic sugar acids (e.g. aldonic acids, $HOOC—(CHOH)_n—CH_2OH$, n=1 to 4), ulosonic acids, uronic acids, aldaric acids $(HOOC—(CHOH)_n—COOH$, n=1 to 4), gluconic acid, glucuronic acid, mannonic acid, mannuronic acid, galactonic acid, galacturonic acid, ascorbic acid, glyceric acid, xylonic acid, neuraminic acid, iduronic acid); dicarboxylic acids (e.g. oxalic acid, malonic acid, succinic acid, glutaric acid, adipic acid, pimelic acid, suberic acid, azelaic acid, sebacic acid, phthalic acid, isophthalic acid, terephthalic acid, maleic acid, fumaric acid, glutaconic acid, traumatic acid, muconic acid); tricarboxylic acids (e.g. citric acid, isocitric acid, aconitic acid, propane-1,2,3-tricarboxylic acid, trimesic acid); Hydroxy-carboxylic acids (e.g. glycolic acid, lactic acid, malic acid, citric acid, tartaric acid, mandelic acid, 2-hydroxybutyric acid, 3-hydroxybutyric acid, 4-hydroxybutyric acid, 3-hydroxypropionic acid, 3-hydroxyisovaleric acid, salicylic acid); polycarboxylic acids; $PF_6^-$, $[PF_3(CF_3)_3]^-$, $[PF_3(C_2F_5)_3]^-$, $[PF_3(C_3F_7)_3]^-$, $[PF_3(C_4F_7)_3]^-$, $[F_3C—SO_2—N—SO_2—CF_3]^-$, $[F_3C—SO_2—N—CO—CF_3]^-$, $[F_3C—CO—N—CO—CF_3]^-$, dimethylphosphate, diethylphosphate, dibutylphosphate, dimethyl phosphonate, diethyl phosphonate, dibutyl phosphonate.

From the above cations and anions those that are of natural origin or close derivates of natural ions are attractive in terms of toxicity, environment, corrosiveness, and waste treatment, especially, but not limited to, when combined with each other.

The hygroscopicity or sorption characteristics of ionic liquids may be driven mainly by the anion. Where more electronegative heteroatoms, like O, N, P, S, F, and Cl, are part of the anion, the smaller the anion is, the more the coordinating the anion is, the higher the charge density the anion has, the higher the charge number the anion has, the more the anion forms hydrogen bonds and Van der Waals interactions; the more likely the ionic liquid will attract $H_2O$ vapor and other multipoles. The cation may be affected by introducing hydroxy and ether functions to the alkyl groups.

In the method using an ionic liquid as a desiccant, the vapor may be one out of the group consisting of: $H_2O$, HCN, $H_2S$, $H_2Se$, $H_2Te$, $CO_2$, CO, $CS_2$, COS, $CF_2O$, $CF_2S$, $O_3$, NO, $NO_2$, $N_2O$, $N_2O_3$, NOCl, $NF_3$, $HNO_2$, $HNO_3$, RCOR', RCOH, RCOOH, $CF_3SO_3H$, $CF_3COOH$, RCOOR', ROH, ROR (including cyclic ethers like tetrahydrofuran), RSH, RSR (including cyclic thioethers like tetrahydrothiophen), $ROCl$, ROBr, $RONH_2$, RONHR', RONR'R'', $RSO_2Cl$, $RSO_2Br$, ROCN, RCON, RCN, HF, HCl, HBr, HI, $SO_2$, $SO_3$, $NH_3$, $NH_2R$, NHR'R'', NR'R''R''', $PH_3$, $PH_2R$, PHR'R'' PR'R''R''', $BF_3$, $BCl_3$, $BBr_3$, $B_2H_6$, $BrF_3$, $ClF_3$, $ClF_5$, ClCN, $IF_5$, $AsH_3$, $CH_3F$, $CH_3Cl$, $CH_3Br$, $CH_3I$, $POCl_2$, $PSCl_2$, $PF_5$, $SF_4$, $SF_6$, $SO_2F_2$, $SO_2Cl_2$, SOCl, $H_2C=CHBr$, $H_2C=CHCl$ and ethylene oxide. In general, any vapor having a multi-pole moment and that may be classified as a harmful substance, irritant, or toxic substance (e.g. strong acids and strong bases), may be sorbed using a method according to embodiments. In particular, the sorption process may be used to remove these gases or vapors from the group consisting of compressed air, inhaled air, exhaled air, and ambient air.

At least one of R, R', R'' and/or R''' is a moiety out of the group consisting of: $C_1$-$C_8$-alkyl, alkenyl, alkinyl, cycloalkyl, cycloalkenyl, aryl and heteroaryl. R, R', R'' and/or R''' may denote a moiety or radical, which may be partially and/or independently substituted. For clarity reasons it should be mentioned that in this application the term $C_1$-$C_8$-alkyl or similar terms is an abbreviatory notation for $C_1$-alkyl, $C_2$-alkyl, . . . , up to $C_8$-alkyl or similar terms.

According to embodiments, the anion comprises at least one polar group. The polar group may be formed by an acetate, a sulfonate, a sulfate, a carbonate, and/or a malonate compound. Furthermore, it should be noted that the anion may be polar. The anion may be formed by a small ion having a high charge density or by an ion, carrying a functional group with a heteroatom with a high charge density (e.g. O, N, or F).

The cation may be a quaternary or protonated cation chosen from the group consisting of ammonium, phosphonium, sulfonium, piperidinium, pyrrolidinium and morpholinium.

The cation may be one chosen from the group consisting of trialkylmethylammonium, tetramethylammonium, triethylmethylammonium, tributylmethylammonium, trioctylmethylammonium, trialkylammonium, trimethylammonium, triethylammonium, tributylammonium, and trioctylammonium. The trialkylmethylammonium may be a $C_1$-$C_{10}$-trialkylmethylammonium.

The cation may be one chosen from the group consisting of tetramethylammonium, triethylmethylammonium, tributylmethylammonium, and trioctylmethylammonium.

The anion may be written in the form $[RCO_2^-]$, wherein $[RCO_2^-]$ is one out of the group consisting of carboxylate, formiate, acetate, propionate, butyrate, benzoate, and salicylate.

The anion can be written in the form $[RCO_2^-]$, wherein $[RCO_2^-]$ is a carboxylate and wherein R is a radical out of the group consisting of $C_1$-$C_{30}$-alkyl, $C_3$-$C_{12}$-cycloalkyl, $C_2$-$C_{30}$-alkenyl, $C_3$-$C_{12}$-cycloalkenyl, $C_2$-$C_{30}$-alkinyl, aryl and heteroaryl. The moiety or radical R may comprise or include one or more halogen radicals.

The anion can be written in the form $[RCO_2^-]$, wherein $[RCO_2^-]$ is a carboxylate wherein R represents one to three radicals out of the group consisting of $C_1$-$C_6$-alkyl, aryl, heteroaryl, $C_3$-$C_7$-cycloalkyl, halogen, cyanide, $OR^c$, $SR^c$, $NR_cR^d$, $COR^c$, $COOR^c$, $CO-NR^cR^d$, wherein $R^c$ and/or $R^d$, is one of the group consisting of hydrogen, $C_1$-$C_6$-alkyl, $C_1$-$C_6$-halogenalkyl, cyclopentyl, cyclohexyl, phenyl, tolyl, and benzyl.

A method using an ionic liquid to sorb vapors having an electric multi-pole moment is provided. The vapor may be $CO_2$ or $H_2O$, while the ionic liquid may be an organic salt having a melting temperature of below 200° C., preferably below 100° C., such as organic salts that may be quaternary salts having a generic formula of: $([A]^+)_a[B]^{a-}$ The described method may be useful for processes in which $CO_2$ or $H_2O$ are to be removed as pure substance or a gas or vapor mixture independent of whether $CO_2$ or $H_2O$ is a main or secondary component or a working medium. Applications may include using an ionic liquid as a desiccant in a dehumidifier or air conditioning unit based on ionic liquid/$H_2O$ or ionic liquid/$CO_2$ as working media, or removing $CO_2$ or $H_2O$ out of, for example, ambient air.

In general, every vapor having a multi-pole moment and which may be classified as an harmful substance, irritant, or toxic substance (e.g. strong acids and strong bases), may be sorbed by using a method according to embodiments. In particular, the sorption process may be used to remove these gases or vapor from air that is inhaled or exhaled (e.g. for purifying breathable air), or ambient air.

An ionic liquid-desiccant may be used in an air conditioner comprising an absorber and a regenerator. In the ionic liquid-desiccant air conditioner, process air is fed into the absorber through return air duct and leaves the absorber through a supply air duct after desiccation. The ionic liquid desiccant may be discharged by the absorber and may pass through a heat exchanger where it may be preheated by a hot ionic liquid desiccant that is discharged by the regenerator. The hot ionic liquid desiccant is generally contained within a heat exchanger, such as a finned tube coil, microchannel plate, or the like, so that any water vapor in the ionic liquid desiccant is not adsorbed by the hot ionic liquid desiccant. The preheated ionic liquid desiccant may be regenerated in the regenerator (e.g., a boiler) with regenerated ionic liquid desiccant being sent to a desiccant pump of the absorber, such as through an interchanger. Liquid water or water vapor may be discharged or recycled through an outlet duct.

The absorber may be a counterflow absorber. In this instance, an ionic liquid desiccant flow and optional cooling air are passed downward while the gas stream is passed upward. The ionic liquid desiccant flow is optionally collected in a desiccant reservoir for subsequent return to the regenerator, such as through an interchanger.

The absorber may be a crossflow absorber. In this instance, an ionic liquid desiccant flow, and optional cooling air are passed downward while the gas stream is passed horizontally. The ionic liquid desiccant flow is optionally collected in a desiccant reservoir for subsequent return to the regenerator, such as through an interchanger.

Either the counterflow or crossflow absorbers may further comprise a cooling water flow or a water blend flow (hereinafter referred to as cooling water flow) to cool the air being treated and remove the heat of sorbtion that is released when the sorbent is adsorbed. This cooling water flow is generally contained within a heat exchanger, such as a finned tube coil, microchannel plate, or the like, so that the cooling water flow is not adsorbed by the desiccant.

To increase the amount and duration of contact between the process gas and the ionic liquid desiccant, the absorber may comprise one or more of a variety of extended surfaces. In general, the contact between the ionic liquid desiccant and the gas stream to be dehumidified is characterized by an extension of the surface area of the ionic liquid desiccant. This may be accomplished by contacting the ionic liquid desiccant with an extended surface, which may or may not be cooled, that provides enhanced vapor transfer and heat transfer mechanisms. Such extended surfaces are characterized by high surface area to volume ratio, and in the case of ionic liquid desiccants, an ability to flow the ionic liquid desiccant over the extended surface enables, and may enhance, the heat and mass transfer by increasing the amount and duration of contact between the ionic liquid desiccant and the gas stream. Such extended surfaces are known and examples include various ones from atomization (least preferential and not requiring a structured surface), cross-corrugate media, random pack medium, structured pack medium, wicking blades, and others not specified herein. Because the ionic liquid desiccant may be selected to be non-corrosive, especially when compared to traditional liquid desiccants LiCl and $CaCl_2$, the extended surfaces may be constructed of common materials such as aluminum, copper, ferrous materials, and alloys thereof as well as polymeric, cellulosic materials, and organic or inorganic fibrous materials.

The extended surfaces may be present in an isolated enclosure, or in an enclosure with heating or cooling elements, such as coils. In the case where the surfaces are present in a chamber with heating or cooling elements, because of the non-corrosive nature of the ionic liquid desiccant, the heating or cooling elements may be constructed of common heat transfer material, such as copper, aluminum, ferrous materials, and alloys thereof.

The surfaces may be treated to reduce the surface tension to provide even flow of the ionic liquid desiccant. Such surface treatments may include flocking materials, scrims, chemical and physical surface etching, or plasma or corona field treatments, to name a few.

The ionic liquid desiccant may be flowed over the surfaces and brought in contact with the gas stream. The interaction of the dried or partially dried ionic liquid desiccant with the gas stream containing moisture causes the moisture to change from its gaseous phase in the gas stream to its liquid phase in the ionic liquid desiccant stream, in part because the dried ionic liquid desiccant stream will have a lower vapor pressure that the moist gas stream. The flow rate of the ionic liquid desiccant is from about 0.1 gpm/1000 scfm to about 10 gpm/1000 scfm, such as from about 0.5 gpm/1000 scfm to about 5 gpm/1000 scfm, from about 0.5 gpm/1000 scfm to about 2 gpm/1000 scfm, or from about 6 gpm/1000 scfm to about 8 gpm/1000 scfm.

The temperature of the gas stream during the absorption may be about ambient temperature, such as 25° C. The temperature of the ionic liquid desiccant during the absorption may be from about 50° C. to about 90° C. or about 100° C. to about 175° C., about 50° C. to 80° C., or about 120° C. to 175° C. The relative humidity of the gas stream during the absorption may be from about 20% to about 100%, such as from about 30% to about 90%, about 40% to about 80%, about 50% to about 70%, or about 60%. The relative humidity of the treated gas stream after absorption may be from about 1% to about 50%, such as from about 5% to about 45%, from about 10% to about 40%, from about 15% to about 35%, from about 20% to about 30%, or about 25%. Typically the relative humidity of the treated gas stream after absorption is below 40%.

By heating the ionic liquid desiccant before it is flowed over, for example, the extended surfaces, the water content in the ionic liquid desiccant before absorption may be from about 1 to about 60% water or sorbate per mass of ionic liquid, such as from about 10 to about 50% water or sorbate per mass of ionic liquid. This allows the ionic liquid desiccant to absorb more water vapor from the gas stream per unit volume of the ionic liquid desiccant, thus making it possible to reduce the amount and/or flow rate of the ionic liquid desiccant that is flowed over the surfaces. The flow rate of the ionic liquid desiccant during absorption may be from about 0.1 gpm/1000 scfm to about 10 gpm/1000 scfm, such as from about 0.5 gpm/1000 scfm to about 5 gpm/1000 scfm, from about 0.5 gpm/1000 scfm to about 2 gpm/1000 scfm, when passed over cooled surfaces. The flow rate of the ionic liquid desiccant during absorption may be from about 6 gpm/1000 scfm to about 8 gpm/1000 scfm, such as from about 6.5 gpm/1000 scfm to about 7.5 gpm/1000 scfm, from about 6.75 gpm/1000 scfm to about 7.25 gpm/1000 scfm, or about 7.0 gpm/1000 scfm when not passed over cooled surfaces.

After the ionic liquid desiccant flows across the surfaces, the ionic liquid desiccant exits the device with a higher concentration of water and higher vapor pressure. All or a portion of this less concentrated ionic liquid desiccant is then transported to a separate area where the desiccant is desorbed. The desorption may be accomplished by a variety of means ranging from direct water boil off to heating of the ionic liquid desiccant and passing air over the heated surface of the ionic liquid desiccant to evaporate water to the passing air. The later process may also be aided by the extended surface mechanisms discussed above.

FIG. 1A shows a rudimentary version of a traditional desiccant dehumidifier. The gas stream to be dehumidified 100 is passed vertically through a packed fill bed 101. The concentrated liquid desiccant 102 is flowed countercurrent to the air over the gas stream. As the gas stream makes contact with the desiccant it gives up its sorbate to the desiccant and leaves the bed with a lower sorbent concentration. The gas leaves with a higher temperature as heat of condensation has been released during the adsorption process. The now more dilute sorbent, or a portion of the more dilute sorbent, is then transported by a pump 103 to a heater 104 where it is heated and brought in contact with a second air stream 105 to remove the sorbate, after which it is returned to the adsorption site via a pump 106 through an energy recovery heat exchanger 107. The system may include recirculation paths 115 limiting the amount of adsorbant that transfers from the adsorption side to the desorption side based on sorbate loading. It should be noted that, alternately, a vacuum could be used to regenerate the sorbate, depending upon the sorbent or hot air may be use in lieu of heating the liquid directly.

Figure 1B:
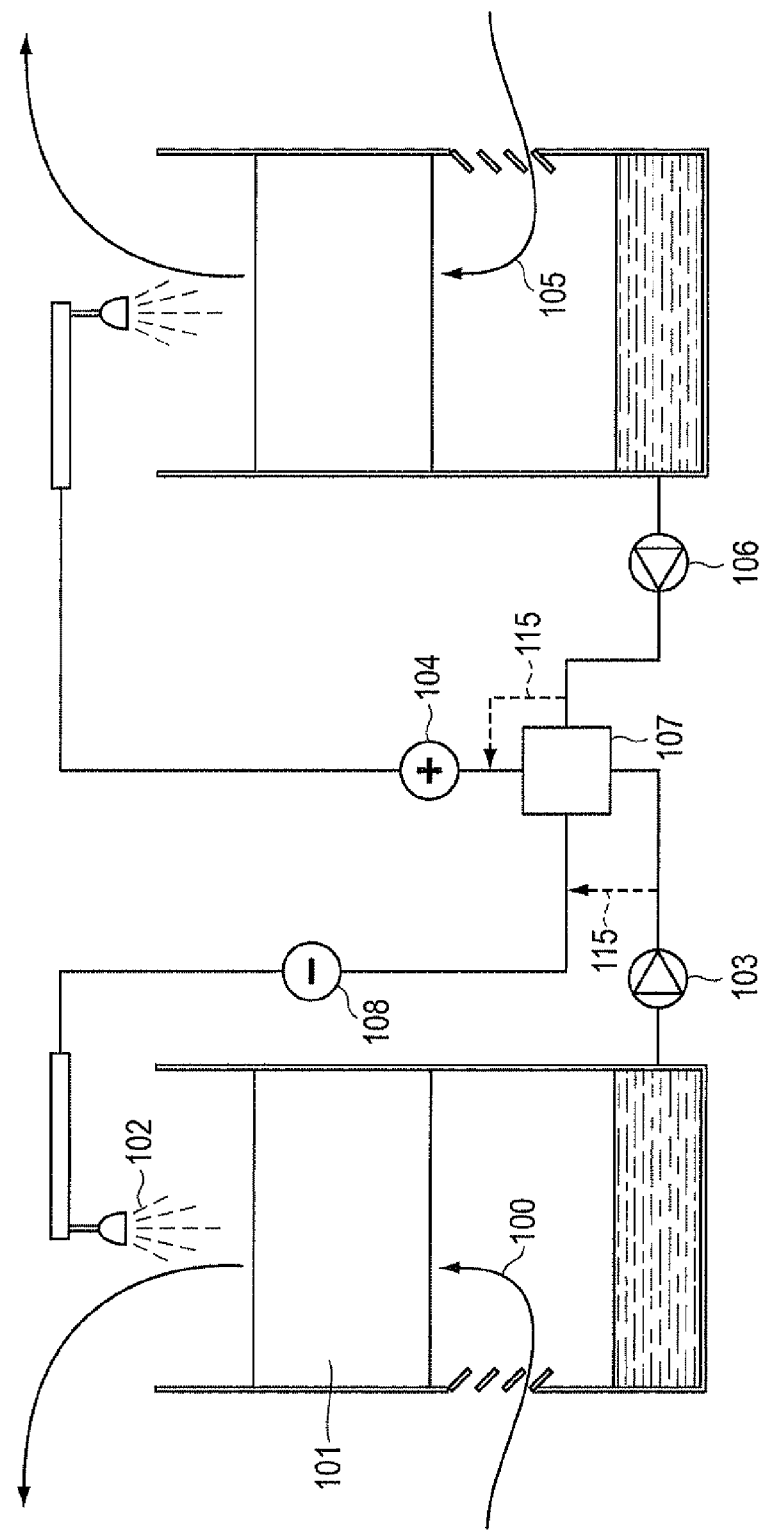
FIG. 1B illustrates an enhanced dehumidification arrangement with additional cooling.

The system can be further enhanced, as shown in FIG. 1B, with the addition of a cooling source 108 to cool the liquid desiccant before the adsorption cycle. The cooler liquid will mitigate the temperature rise from heat of condensation during adsorption, and enable higher sorbate removal rates.

Figure 1C:
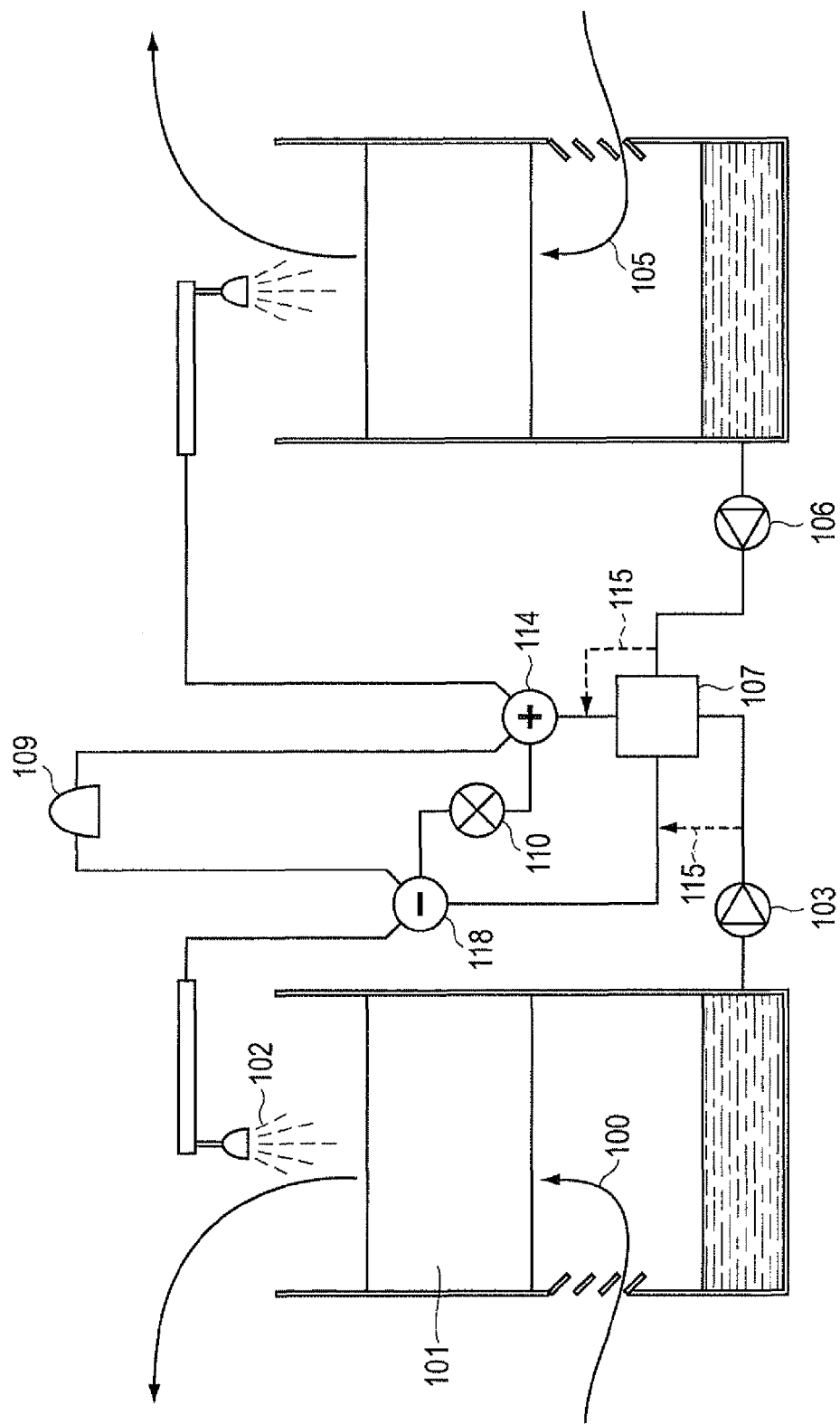
FIG. 1C illustrates a heat pump enhanced arrangement of a dehumidifier.

Further enhancement, as shown in FIG. 1C, includes the use of a heat pump system in lieu of the heater and cooler. In this case compressor 109 recirculates a refrigerant through a refrigerant condenser 114 expansion valve 110 and evaporator 118.

The most sophisticated devices involve flowing the desiccant over cooled surfaces. Lowenstein, in U.S. Pat. Nos. 5,351,497; 6,745,826; and 7,269,966 describes methods wherein the liquid desiccant is cooled as it passed through the air exchange surface.

Figure 2:
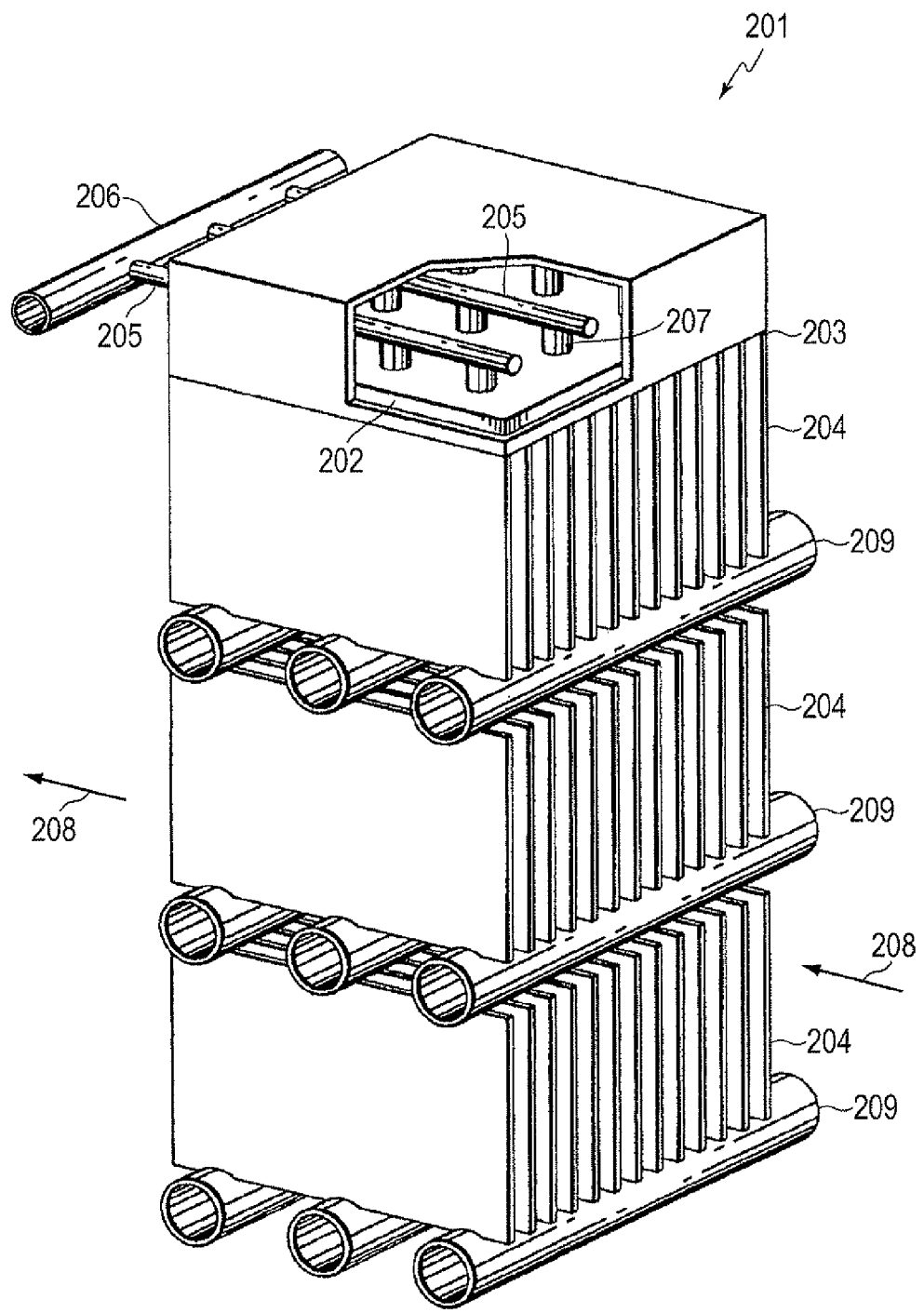
FIG. 2 illustrates an embodiment with ionic liquid flowing over heated or cooled surfaces to enhance adsorption and desorption processes.

FIG. 2 shows an exemplary apparatus for flowing an ionic liquid desiccant over cooled surfaces according to embodiments. A cooled absorber 201 may comprise a single distribution pad 202 in direct contact with the top edge 203 of the corresponding wicking fins 204, and a plurality of distribution tubes 205 in fluid communication with a distribution manifold 206. The distribution tubes 205 may each include a series of spray nozzles 207 disposed along a length thereof. The spray nozzles 207 may be adapted to spray streams of the liquid desiccant onto the top surface of the single distribution pad 202. The sprayed liquid desiccant may permeate throughout the pad 202 eventually flowing onto the surface of the wicking fins 204. The wicking fins 204 are, in this example, closely spaced to one another; the formation of droplets under the pad 202 can be substantially eliminated.

The ionic liquid desiccant flows around the outer surface of the top row of tubes 209, and is cooled by contact with the tubes 209. Drawn downward by gravity, the ionic liquid desiccant flows to the top of the wicking fins 204. The ionic liquid desiccant spreads across the outer surface of the wicking fins 204 as a continuous flow without undesirably forming drips or droplets. A process air stream 208 that is to be cooled and dried is passed through the spaces between the fins 204 and around the tubes 209. The process air stream 208 may be introduced horizontally, vertically or at an angle to the evaporator 201. The process air stream 208 comes into contact with the ionic liquid desiccant. The ionic liquid desiccant absorbs the heat and water vapor from the process air stream 208. The process air stream 208 leaving the cooled absorber 201 possesses a lower water content, while maintaining at least the same or lower temperature than entering the evaporator 201.

When using the single distribution pad 202 and spray system for supplying the liquid desiccant, a partition 208 is mounted on top of the distribution pad 202 and enclosing the distribution tubes 205 and spray nozzles 207. The partition 208 isolates and prevents the liquid desiccant sprayed from the nozzles 207 from becoming entrained in the process air stream 208.

Figure 3:
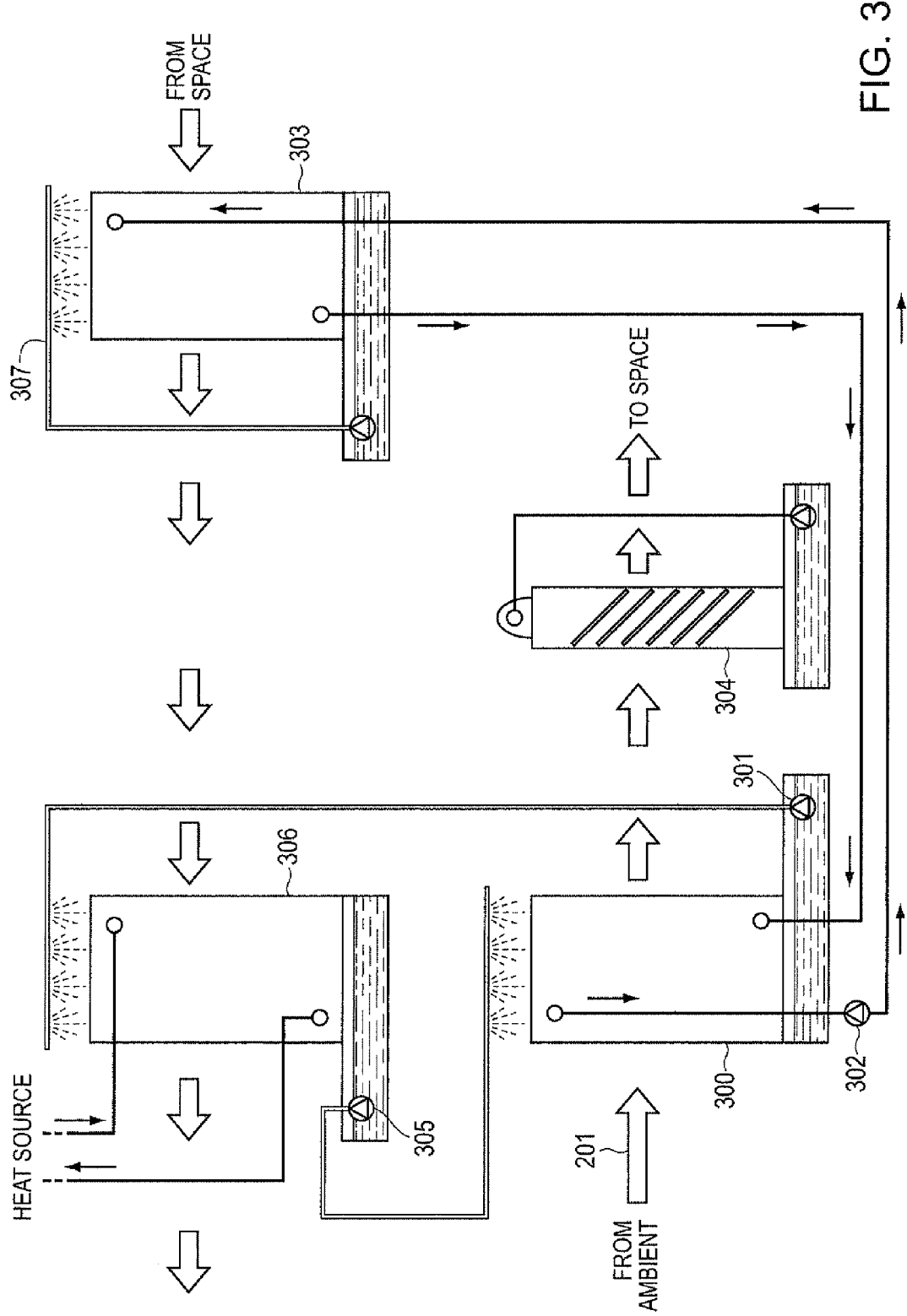
FIG. 3 illustrates an arrangement for desiccant cooling.

FIG. 3 describes a heat-based ionic-liquid desiccant cooling system according to this disclosure. In this arrangement, ambient air, or air to be cooled, 301 is passed over an ionic liquid desiccant absorption surface 300 the cooling for which is provide either via cooled surface (described in the prior example) or alternately by cooling of the liquid desiccant flow (not shown). The air leaves the absorption having less moisture and a temperature approaching the wet bulb of the air exhausting from the space. If the air is sufficiently dried, it can be further cooled by direct evaporative cooling via evaporative cooler 304 before delivery to the space. The primary source of the cooling capacity is generated by wet bulb cooling of the desorption surface via a fluid cooler 303 located in an exhaust, or secondary air stream. In this device, the liquid is cooled to close to the wet bulb temperature of the air, which is typically at or below 65° F., by circulating an evaporation-cooled water flow 307 on the secondary side of the exchanger. The more dilute ionic liquid desiccant is circulated over a heated extended surface media 306 (or is heated and flowed over a packing, not shown) where it releases sorbent, in this case water vapor, to the secondary, or another air stream. The fluids may be transported through the systems by pumps (for example 301, 302, and 305).

Due to the non-corrosive nature of the selected ionic liquid desiccants the cooled extended surfaces used in this invention need not be produced of exotic materials, or with exotic designs as shown in Lowenstein's patents. In embodiments the liquid desiccant is flowed over a traditional cooling coil made of traditional materials, i.e., copper or aluminum tubes with aluminum fins, however, other metals may also be selected.

Figure 4:
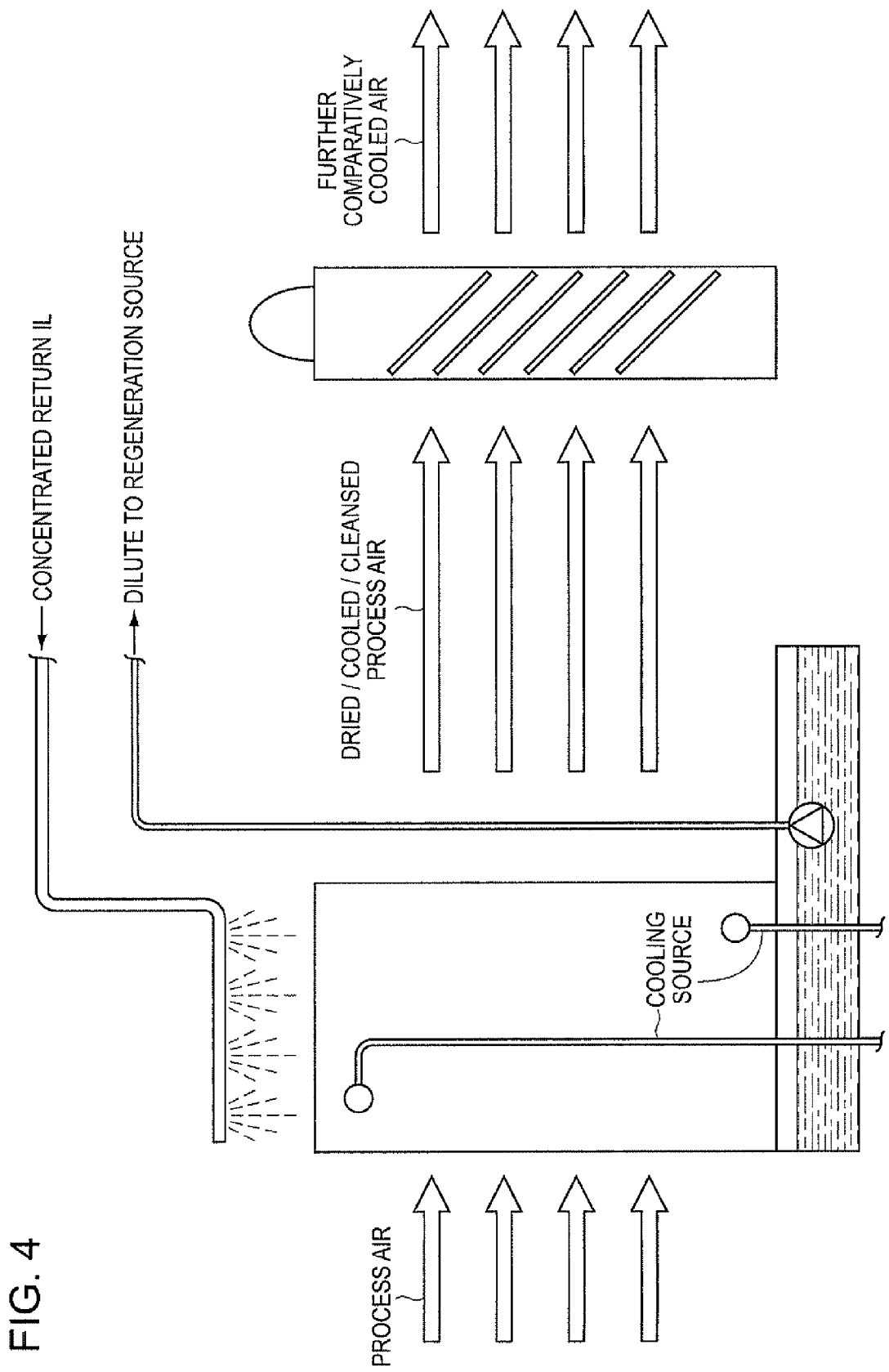
FIG. 4 illustrates an ambient process air cooling.

FIG. 4 shows a more generic desiccant cooler for use in process air cooling, for example gas turbine inlet cooling. In this device, air is first cooled and dehumidified with a concentrated ionic liquid desiccant stream and a cooling water stream (preferably cooled via a cooling tower or fluid cooler) in a liquid desiccant absorption surface 300. The ionic liquid desiccant is regenerated remotely, preferably using a waste heat source, or in the example of a gas turbine, the waste heat in the turbine exhaust stream. Optionally, the cooled and dehumidified air can be further cooled by direct evaporative cooling (304).

Ionic liquid desiccants may also be used in dehumidification devices to remove water vapor from gas streams, such as air, in much the same way as described above. However, dehumidification devices are generally open systems and, thus, it is important that the desiccant used is not toxic. Various ones of the anions and cations for use in ionic liquid desiccants described herein are generally not toxic and, thus, are safe for use to treat gas sources that will be inhaled after treatment. However, even some of the liquid desiccants described herein that may be toxic may be useful in certain applications.

The following experimental results show the ability of ionic liquids to absorb $CO_2$.

Figure 5:
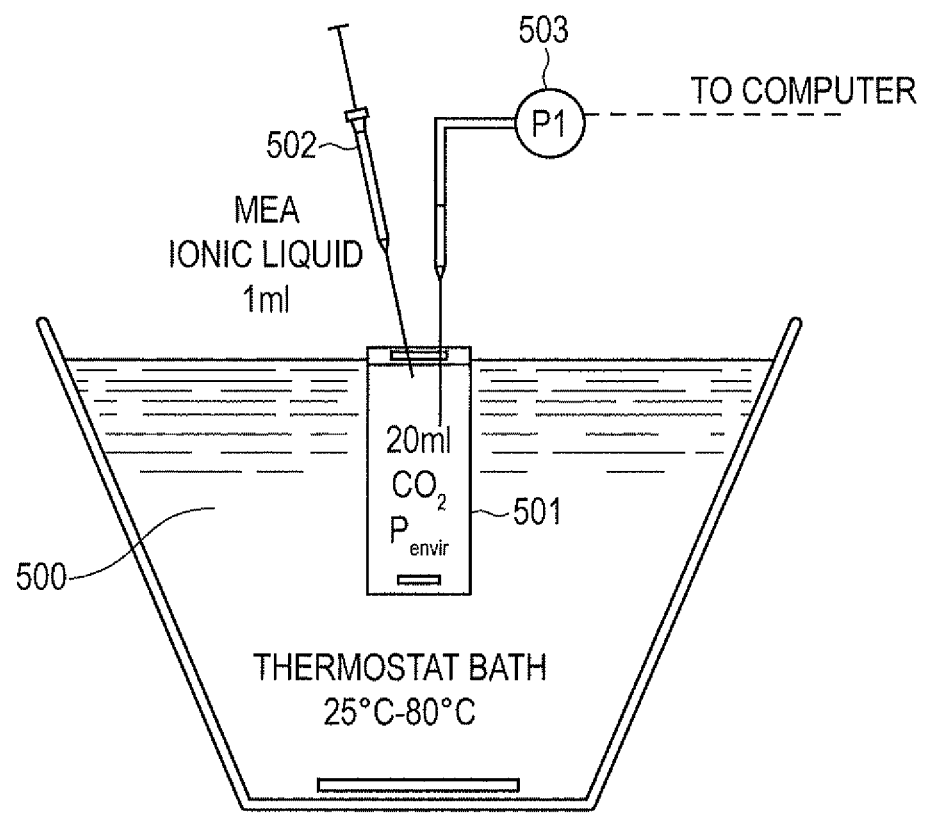
FIG. 5 schematically illustrates a test arrangement for measuring a gas sorption.

FIG. 5 schematically shows a fluid tank 500 used as a heat reservoir in order to provide a constant temperature selectable in the range between 25° C. and 80° C. A vessel or vial 501 having a volume of about 20 ml is placed in the tank, wherein the vial is filled with $CO_2$ at a partial pressure of the environmental pressure (e.g. atmospheric pressure of about 1000 hap). Additionally, a $CO_2$ sorbing fluid is injected 502 into the vial. The sorption of the $CO_2$ is determined by measuring the decrease of the pressure in the vial by a digital manometer 503 that is connected to a computer. The speed of the pressure decrease is an indicator of the reaction kinetics and the total decrease of the pressure is an indicator for the total $CO_2$ sorption. The tests were performed at two temperatures 25° C. and 80° C., wherein at the higher temperature a smaller amount of $CO_2$ may be desirable because this may be an indicator for an estimation of the ability of the fluid to release the $CO_2$. For testing, several ionic liquids are injected and compared to a reference sample, wherein an aqueous solution (30%) of monoethanolamine (MEA) is used. In particular, the resulting parameter was the equilibrium concentration at constant reduced pressure (i.e. the pressure reached in the vial), and at the set temperature, wherein the result was calculated in $mol_{gas}$ per $mol_{IL}$, wherein the index gas denotes $CO_2$ and the index IL denotes ionic liquid. The equilibrium concentrations were calculated by the following formula:

$$\frac{\text{pressure decrease [hPa]} \cdot 0.02145 \text{ [l]}}{83.145 \text{ temp [K]}} \bigg/ \frac{\text{mass of } CO_2 \text{ [g]}}{\text{molar mass [g/mol]}}$$

wherein 0.02145 is the volume of the vial and 83.145 is the gas constant in the used units.

The following results were achieved:

| name | solvent | conc. [%] | T [° C.] | pressure decrease [hPa] | time [min] | charging $mol_{CO2}$/ $mol_{[L]}$ |
|---|---|---|---|---|---|---|
| TBMP-acetate | | 100 | 25 | 332 | 4000 | 0.08 |
| TBMP-acetate | | 100 | 80 | 342 | 3160 | 0.08 |
| TEMA-acetate | $H_2O$ | 70 | 25 | 495 | 2400-5000 | 0.1 |
| TEMA-acetate | $H_2O$ | 70 | 80 | 130 | 2400 | 0.03 |
| TOMA-acetate | | 100 | 25 | 448 | 2500 | 0.19 |
| TOMA-acetate | | 100 | 80 | 122 | 1000 | 0.05 |
| MEA | $H_2O$ | 30 | 25 | 679 | 250 | 0.12 |
| MEA | $H_2O$ | 30 | 80 | 440 | 130 | 0.08 | wherein:
TBMP denotes tributyl methyl phosphonium,
TEMA denotes triethyl methyl ammonium,
TOMA denotes trioctyl methyl ammonium, and
MEA denotes monoethanolamine.

As can be seen, the acetate anion may be responsible for a high $CO_2$ sorption, while similar sorption amounts may be achievable by cations having different structures.

Figure 6:
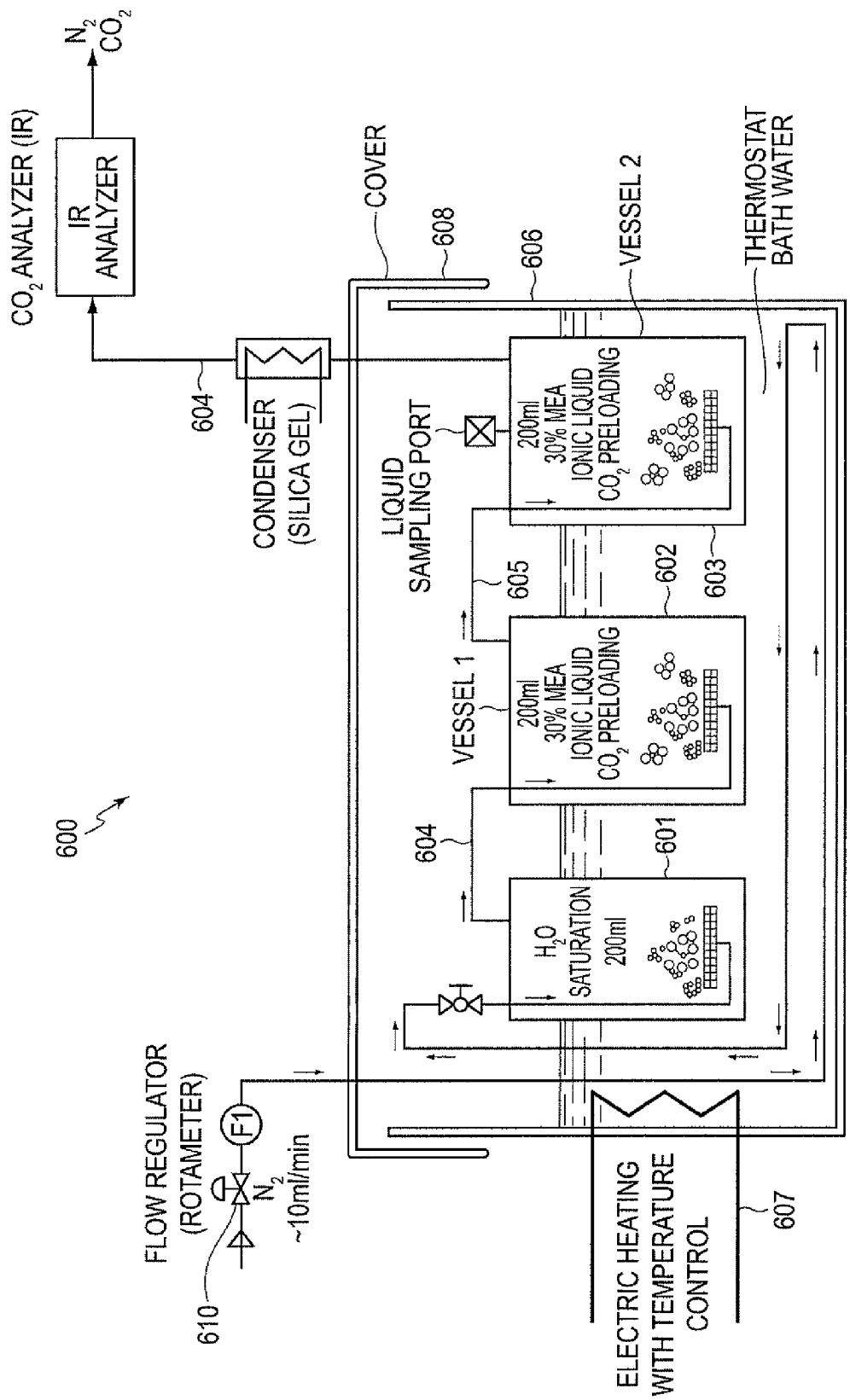
FIG. 6 schematically illustrates a test arrangement for measuring equilibrium curves.

FIG. 6 schematically illustrates a test arrangement 600 for measuring equilibrium curves. In particular, FIG. 6 shows an equilibrium cell comprising three vessels 601, 602 and 603 each closed by a respective frit in order to ensure a good mass transfer between the gas (e.g. $CO_2$ and the sorbing fluid). The vessels are interconnected by flexible plastic tubes 604 and 605 having non-return valves. The vessels are placed in a heat reservoir 606 to ensure a constant temperature, which can be controlled by using an electric heating element 607. The heat reservoir is covered by a cover or lid 608 in order to ease the temperature control. A container or condenser 609 including silica gel is implemented downstream of the equilibrium cell wherein the silica gel is used to dry the generated gas, which is then analyzed. Additionally, an input amount or volume to the equilibrium cell is controlled or regulated by using a rotameter 610.

Figure 7:
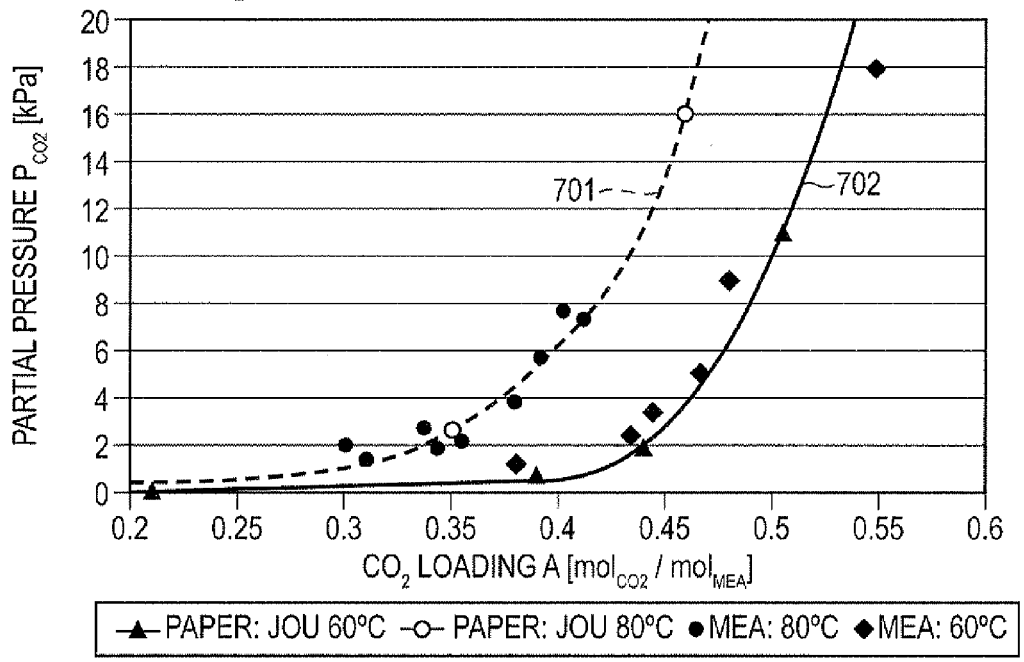
FIG. 7 illustrates equilibrium curves for monoethanolamine.

FIG. 7 illustrates equilibrium curves for monoethanolamine. In particular, FIG. 7 shows the partial pressure $p_{CO2}$ versus the $CO_2$ loading for 60° C. and 80° C. for an aqueous solution (30%) of monoethanolamine. For each temperature a respective curve is approximated based on measurements, wherein a first curve 701 approximates the equilibrium curve for 80° C. while a second curve 702 approximates the equilibrium curve for 60° C. The values generated for MEA are comparable with the data published in literature, known to the expert.

Figure 8:
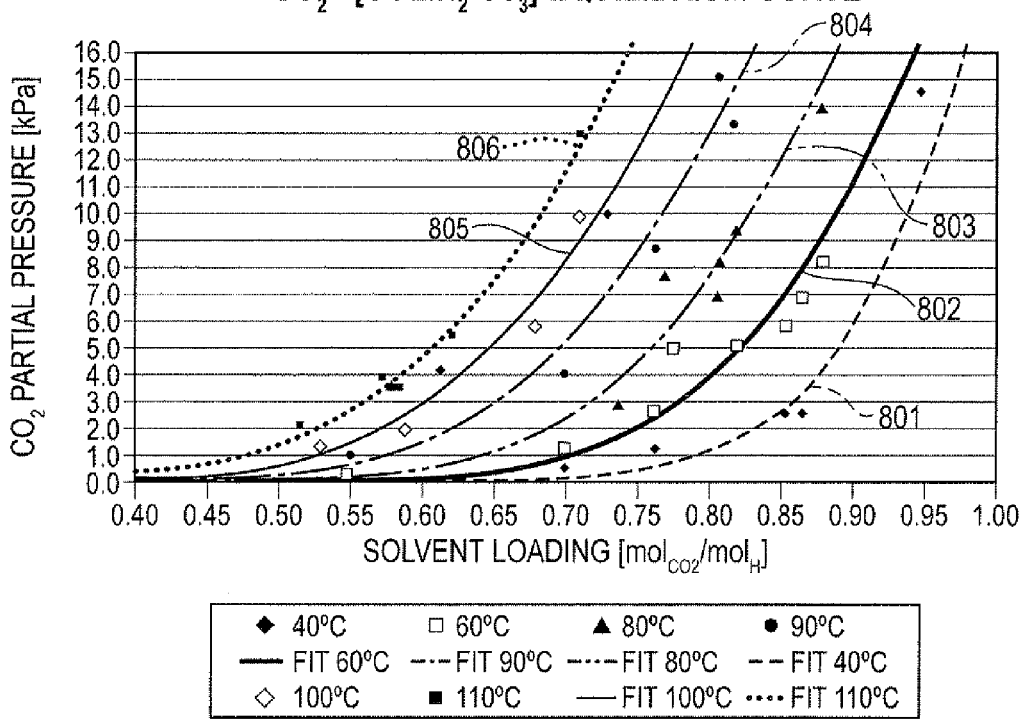
FIG. 8 illustrates equilibrium curves for choline carbonate.

FIG. 8 illustrates equilibrium curves for choline carbonate. In particular, FIG. 8 shows values for the partial pressure $p_{CO2}$ versus the $CO_2$ loading for six different temperatures 40° C., 60° C., 80° C., 90° C., 100° C., and 110° C. for an aqueous solution (60%) of choline carbonate. Additionally, to the measured values fits for the different temperatures are shown in FIG. 8 as well. In particular, graph 801 shows the fit for 40° C., graph 802 shows the fit for 60° C., graph 803 shows the fit for 80° C., graph 804 shows the fit for 90° C., graph 805 shows the fit for 100° C., and graph 806 shows the fit for 110° C.

Furthermore, an experiment concerning the influence of water on the $CO_2$ sorption was performed. TEMA acetate having a water amount of 10% was used as an ionic liquid. TEMA acetate was introduced for four days into a $CO_2$ atmosphere having a pressure of 600 hPa at a temperature of 80° C. In one case the TEMA acetate included a surplus of water while in the other case no water was added. The water content of the sample including water increased from 10% to 35% while the sample without water increased only from 10% to 15%. After four days, acid was added to the two samples, which lead to a clear generation of foam or gas in the sample without water, while the reaction of the probe with water was less intense. Thus, the water may lead to a reduced $CO_2$ sorption of the ionic liquid.

Figure 9:
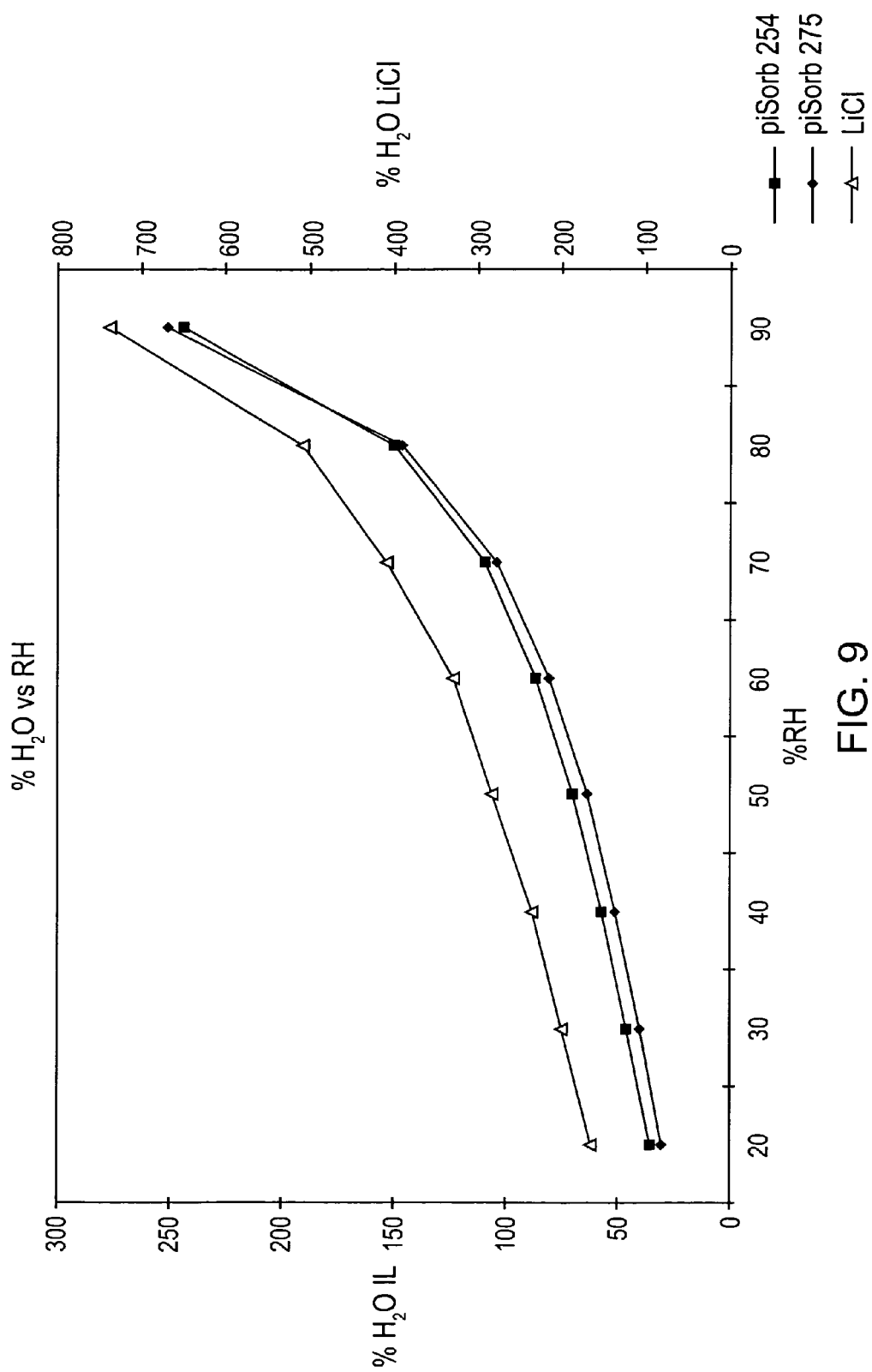
FIG. 9 illustrates isotherms of ionic liquid desiccants and LiCl.

FIG. 9 is an isotherm showing a comparison of ionic liquid desiccants with a LiCl liquid desiccant. The percentages of ionic liquid desiccants and LiCl to percentages of water at various relative humidity are listed in the table below. IL-2 and IL-3 are Triethylmethylammonium acetate and 1-ethyl-3-methyl-imidizolium acetate, respectively.

| Test ID: | IL-2 | IL-3 | LiCl | | | |
|---|---|---|---|---|---|---|
| Dry temp, C.: | 80 | 150 | | | | |
| Dry time, min: | 60 | 60 | | | | |
| Test temp, C.: | 50 | 50 | 26 | | | |
| % RH | % H2O | % H2O | % H2O | % LiCl | % IL-2 | % IL-3 |
| 20 | 35.3 | 30.3 | 165.251989 | 37.7 | 73.9 | 76.7 |
| 30 | 46.0 | 40.4 | 200.3003 | 33.3 | 68.5 | 71.2 |
| 40 | 57.4 | 51.3 | 235.57047 | 29.8 | 63.5 | 66.1 |
| 50 | 70.5 | 64.1 | 284.615385 | 26 | 58.7 | 60.9 |
| 60 | 87.1 | 81.3 | 331.034483 | 23.2 | 53.4 | 55.2 |
| 70 | 110 | 105 | 410.204082 | 19.6 | 47.6 | 48.8 |
| 80 | 150 | 147 | 509.756098 | 16.4 | 40.0 | 40.5 |
| 90 | 245 | 252 | 740.336134 | 11.9 | 29.0 | 28.4 |

As is shown in the above table, the percentage of water in the ionic liquid desiccants is lower than the percentage of water in the LiCl. The similarity in the shape of the isotherms of the ionic liquid desiccants and the LiCl liquid desiccant indicates that the ionic liquid desiccants will perform similarly to LiCl liquid desiccant in dynamic adsorption/desorption systems.

Figure 10:
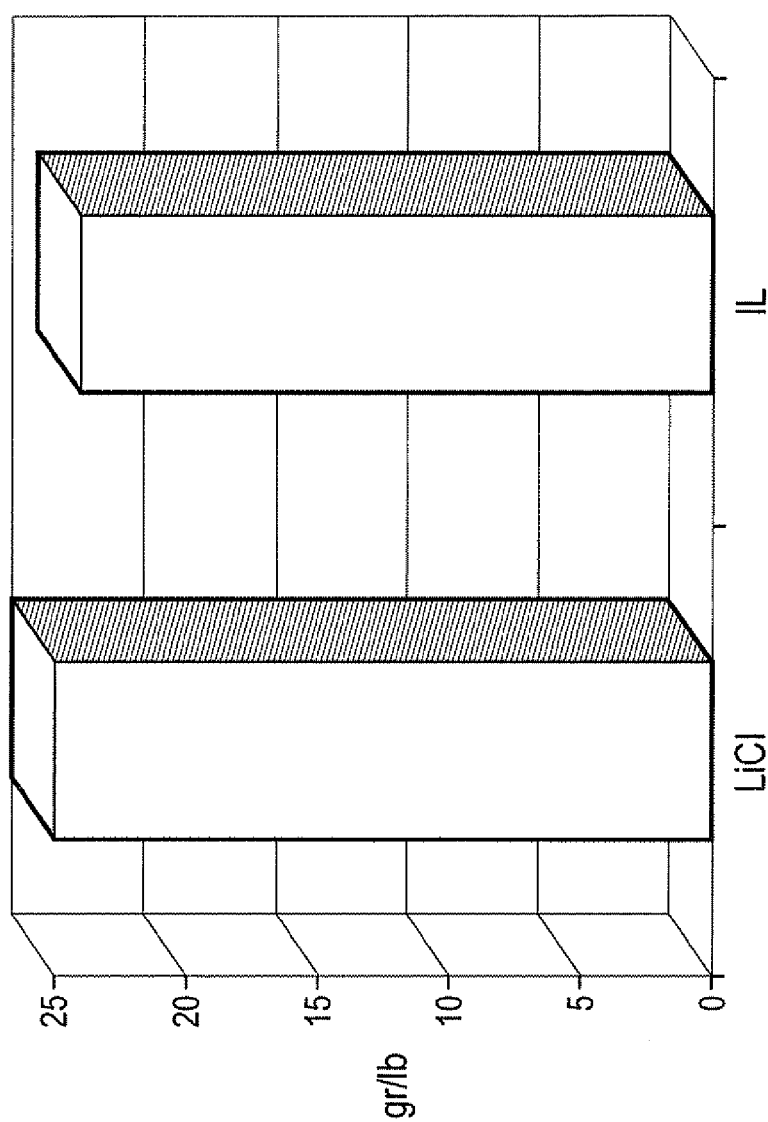
FIG. 10 illustrates the ΔX of an ionic liquid desiccant and LiCl.

FIG. 10 shows the results of LiCl used in a commercial dehumidifier compared to the result using 1-ethyl-3-methylimidazolium-acetate as an ionic liquid desiccant in a commercial dehumidifier. As can be seen in FIG. 7, the measured ΔX (change in absolute humidity gr/lb) value of the ionic liquid desiccant is nearly identical to the measured ΔX value of LiCl. The similarity in the ΔX value of ionic liquid desiccants and the ΔX value of the known liquid desiccant LiCl shows that the ionic liquid desiccants perform nearly identically to the LiCl even though they are less toxic and corrosive.

Figure 11:
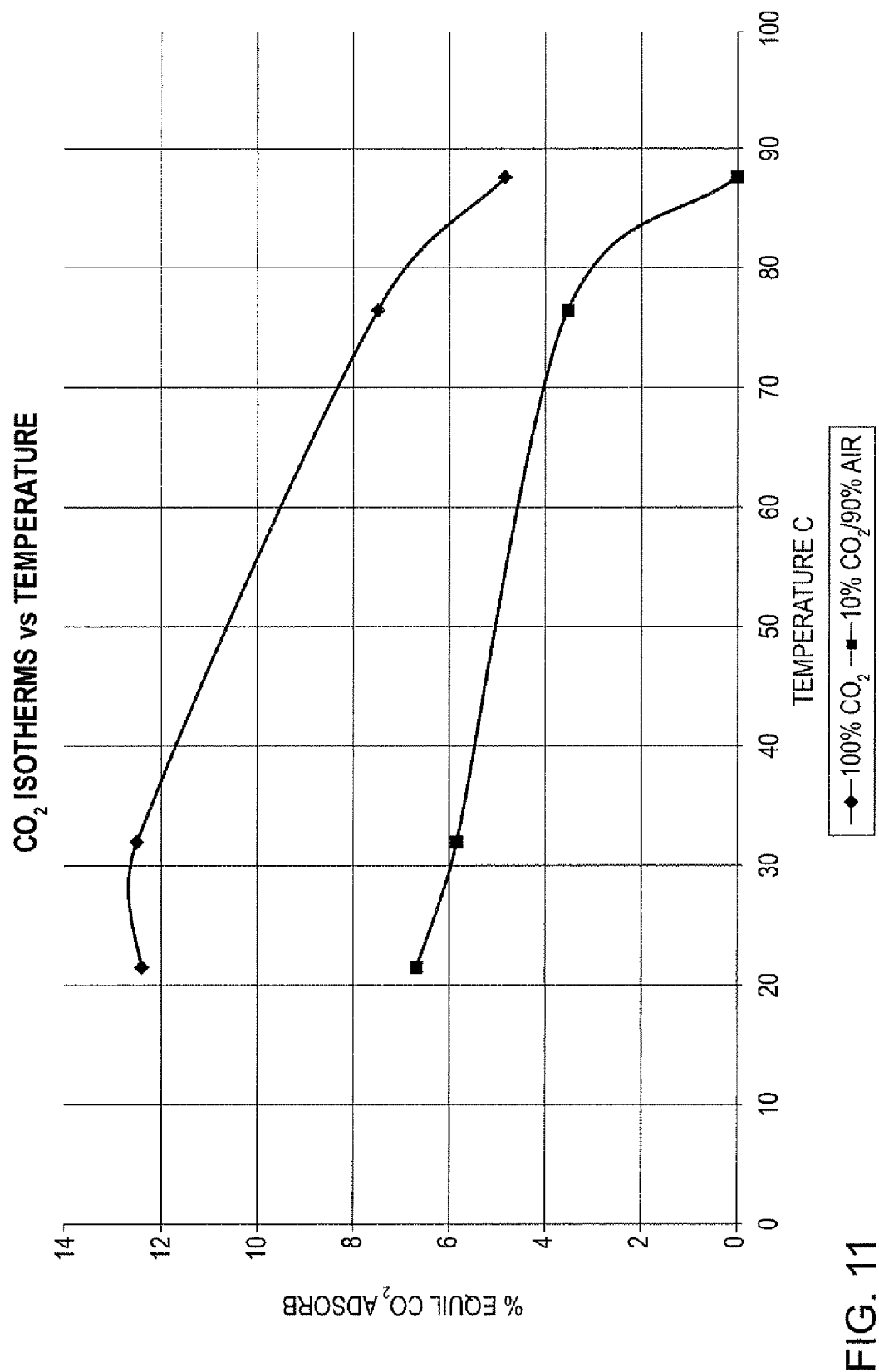
FIG. 11 illustrates $CO_2$ isotherms.

FIG. 11 is an isotherm showing the equilibrium of $CO_2$ adsorbtion versus temperature. The samples are first dried for 240 minutes in air at a low relative humidity at a temperature of 87° C., then equilibrated with 100% $CO_2$ or 10% $CO_2$/90% air at low relative humidity and at various temperatures. The percentages of $CO_2$ and relative humidity are listed in the table below. IL-4, IL-5, IL-6, and IL-7 are each 1-ethyl-3-methylimidazolium acetate.

| Test ID: | IL-4, 5 | IL-4, 5 | Test ID: | IL-6, 7 | IL-6, 7 |
|---|---|---|---|---|---|
| % $CO_2$: | 100 | 100 | % $CO_2$: | 10 | 10 |
| % Air: | 0 | 0 | % Air: | 90 | 90 |
| Temp, C. | % $CO_2$ | % RH | Temp, C. | % $CO_2$ | % RH |
| 87.6 | 4.82 | 0.27 | 87.7 | 0.0 | 0.45 |
| 76.5 | 7.48 | 0.88 | 76.7 | 3.50 | 0.79 |
| 32.0 | 12.5 | 0.97 | 31.9 | 5.84 | 1.16 |
| 21.5 | 12.4 | 1.01 | 21.1 | 6.69 | 1.54 |

Figure 12:
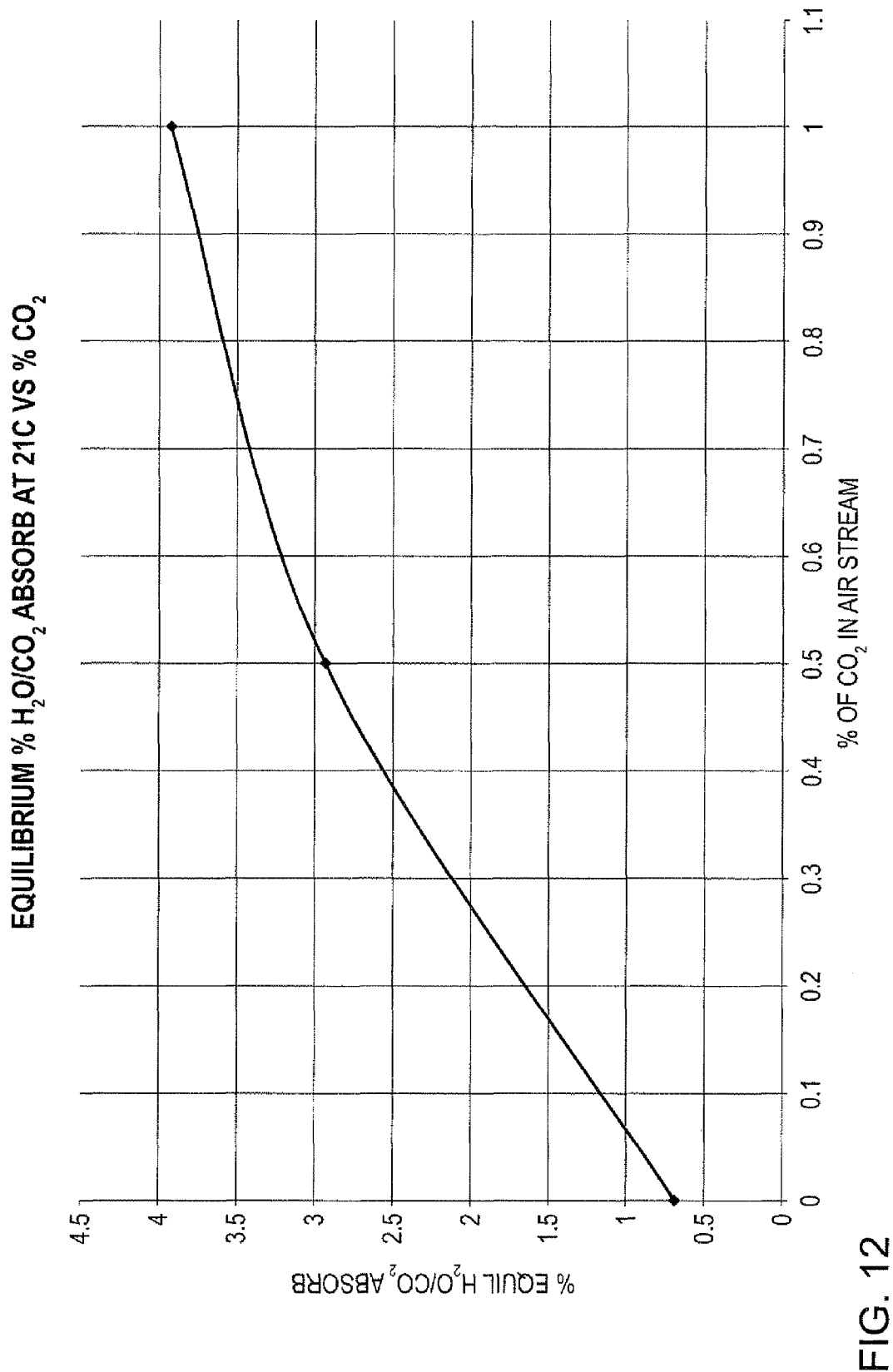
FIG. 12 illustrates Equilibrium of $H_2O$ and $CO_2$.

FIG. 12 is an isotherm showing the equilibrium of $H_2O$/$CO_2$ absorption versus the percentage of $CO_2$ in the air stream. The samples are first dried for 240 minutes in air at low relative humidity at a temperature of 90° C., then the samples are cooled to 21° C. and equilibrated with low relative humidity in air (no $CO_2$), then the samples are equilibrated in air at low relative humidity with 0.5% $CO_2$ then 1% $CO_2$. The percentage of $H_2O$ and relative humidity are shown in the table below. IL-11 is 1-Ethyl-3-methylimidazolium-acetate.

| Test ID: | IL-11 | IL-11 | IL-11 | IL-11 | IL-11 | IL-11 |
|---|---|---|---|---|---|---|
| % $CO_2$: | 0 | 0 | 0.5 | 0.5 | 1 | 1 |
| % Air: | 100 | 100 | 99.5 | 99.5 | 99 | 99 |
| Temp, C.: | 23.7 | 23.7 | 23.7 | 23.7 | 23.7 | 23.7 |
| | % $H_2O$ | % RH | % $CO_2$ | % RH | % $CO_2$ | % RH |
| | 0.69 | 1.38 | 2.94 | 1.25 | 3.93 | 1.56 |

EXAMPLES

In the first two examples trioctylmethylammonium (TOMA)-acetylacetonate or -acetate is used to sorp a gas having an electric multipole moment.

Example 1

Sorption of Hydrogen Sulphide

The experiment was performed at room temperature and a vapor pressure equilibrium of 338 hPa. A beaded bottle is flushed with 120 ml of hydrogen sulphide by using two needles. One of the needles is connected to a manometer having a resolution of 1 hPa. Subsequently 1 ml of TOMA-acetate is injected into the bottle by using one of the needles, wherein the TOMA-acetate was preheated by a hairdryer in order to reduce the viscosity. After 30 minutes of stirring by using a magnetic stir bar a constant reduction of the pressure of 622 hPa was observed. This pressure reduction corresponds to a molar ratio of 0.26 $mol_{H2S}/mol_L$ at an equilibrium pressure of 338 hPa. For comparison, a 30% aqueous solution of monoethanolamine provides, under the same conditions, a pressure reduction of 651 hPa, which corresponds to a molar ratio of 0.11 $mol_{H2S}/mol_L$ at an equilibrium pressure of 309 hPa.

Example 2

Sorption of Carbon Dioxide

The experiment was performed at room temperature and a vapor pressure equilibrium of 523 hPa. A beaded bottle is flushed with 120 ml of carbon dioxide by using two needles. One of the needles is connected to a manometer having a resolution of 1 hPa. Subsequently 1 ml of TOMA-acetylacetonate is injected into the bottle by using one of the needles, wherein the TOMA-acetylacetonate was preheated by a hairdryer in order to reduce the viscosity. After 30 minutes of stirring by using a magnetic stir bar a constant reduction of the pressure of 437 hPa was observed. This pressure reduction corresponds to a molar ratio of 0.18 $mol_{CO2}/mol_{IL}$ at an equilibrium pressure of 523 hPa. For comparison, a 30% aqueous solution of monoethanolamine provides, under the same conditions, a pressure reduction of 670 hPa, which corresponds to a molar ratio of 0.12 $mol_{CO2}/mol_L$ at an equilibrium pressure of 290 hPa.

Example 3

Δm Water Uptake at 19° RH and 79° RH

19 Ionic Liquids and solid lithium chloride as reference has been exposed at 20° C. to a water vapour atmosphere over a saturated, aqueous solution of a.) lithium iodide (19° RH) and b.) ammonium chloride (79° RH), both solutions containing at least 10% solid material and know as so called constant humidity solutions. Each sample of 0.5 g of ionic liquid was weight into small petri dishes of 40 mm diameter and left under the constant humidity atmosphere until no change of mass could be detected, which took at least 3 to 4 weeks. The mass value for 19° RH was subtracted of the mass value at 79° RH, giving a number reflecting the mass uptake of the ionic liquid between this two working points for sorption (desiccation of wet air) and desorption (recycling of wet ionic liquid) of water vapour in percent of the starting weight (Δm %) and relative to the value for LiCl (% Δm LiCl). The results are indicated in the table below.

| Substance | Δm % | % Δm LiCl |
|---|---|---|
| Lithiumchloride, anhydreous | 145.6 | 100.0 |
| 1-Ethyl-3-methylimidazolium-acetate | 81.2 | 55.8 |
| 1-Ethyl-3-methylimidazolium-methansulfonate | 67.3 | 46.2 |
| 1-Ethyl-3-methylimidazolium-trifluormethansulfonat | 16.6 | 11.4 |
| 1-Ethyl-3-methylimidazolium-pivalate | 67.4 | 46.3 |
| 1-Ethyl-3-methylimidazolium-cyanacetate | 68.7 | 47.2 |
| 1-Ethyl-3-methylimidazolium-methoxyacetate | 87.8 | 60.3 |
| 1-Ethyl-3-methylimidazolium-glykolate | 83.9 | 57.6 |
| Bis-(N-Ethyl-N-methylmorpholinium)-sulfate | 64.5 | 44.3 |
| 1-Ethyl-3-methylimidazolium-pyruvate | 66.9 | 45.9 |
| 1-Ethyl-3-methylimidazolium-benzoate | 52.0 | 35.7 |
| Triethylmethylammonium-acetate | 73.8 | 50.7 |
| Bis-(Tetramethylammonium)-sulfate | 80.9 | 55.6 |
| Bis-(Choline)-sulfate | 75.5 | 51.9 |
| Tetramethylammonium-acetate | 95.6 | 65.7 |
| Tetramethylammonium-methoxyacetat | 93.6 | 64.3 |
| Bis-(1-Ethyl-3-methylimidazolium)-malonate | 69.3 | 47.6 |
| Bis-(Triethylmethylammonium)-hydrogenphosphate | 86.5 | 59.4 |
| Bis-(1-Ethyl-3-methylimidazolium)-sulfate | 76.3 | 52.4 |
| Bis-(1-Ethyl-3-methylimidazolium)-hydrogenphosphat | 85.9 | 59.0 |

The term "Bis" denotes here and in all following listings the stoichometry of two cations with charge +1 and one anion with charge −2. The results are calculated as water uptake in mass %, based on the mass difference between the IL saturated at 19° RH and saturated at 79° RH. Independently whether the starting material was solid or liquid, it took up water to equilibrium at 19° RH and liquefied in all cases. This mass at 19° RH was defined as the "starting" mass and it took up more water until equilibrium at 79° RH was reached. All Ionic liquids show smaller uptake than LiCl, but reach up to 65.7% of LiCl.

Finally, it should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises," and the like, does not exclude the presence of elements or steps other than those listed in any claim or the specification as a whole. The singular reference of an element does not exclude the plural reference of such elements and vice-versa. In a device claim enumerating several means, several of these means may be embodied by one and the same item of software or hardware. The mere fact that certain measures are recited in mutually different dependent claims does not indicate that a combination of these measures cannot be used to advantage.

What is claimed is:

1. A method for concurrently sorbing carbon dioxide and water vapor components from a gas stream comprising:
    flowing an ionic liquid sorbant having an ionic component with the formula $[A]^+_a[B]^{a-}$, where (i) $[A]^+$ is a cation, and (ii) $[B]^{a-}$ is an anion selected from the group consisting of carbanions, carboxylate anions, arylsulfonate anions, and alkylsulfonate anions, and the sorbant has a water content of from about 1% to about 10% water per mass of ionic component before absorption of the vapor components,
    contacting the ionic liquid sorbant with the gas stream which comprises at least the carbon dioxide vapor component and the water vapor component; and
    concurrently sorbing at least part of the carbon dioxide vapor component and the water vapor component from the gas stream into the ionic liquid sorbant.

2. The method of claim 1, wherein the ionic liquid sorbant comprises an anion selected from the group consisting of acetate, trifluoromethanesulfonate, methanesulfonate, nonadecafluoro-nonansulfonate and p-toluolsulfonate, trichloroacetate, dichloroacetate, chloroacetate, trifluoroacetate, difluoroacetate, fluoroacetate, methoxyacetate, cyanacetate, glykolate, benzoate, pyruvate, malonate, pivalate, the depротonated or partially deprotonated form of the following monovalent or polyvalent acids: formic acid, acetic acid, propionic acid, butyric acid, valeric acid, caproic acid, enanthic acid, caprylic acid, capric acid, lauric acid, myristic acid, palmitic acid, stearic acid, arachidic acid, O-acetylsalicylic acid, sorbic acid, pivalic acid, fatty acids, isoleucine, alanine, leucine, asparagine, lysine, aspartic acid, methionine, cysteine, phenylalanine, glutamic acid, threonine, glutamine, tryptophan, glycine, valine, proline, serine, tyrosine, arginine, histidine, ornithine, taurine, aldonic acids, ulosonic acids, uronic acids, aldaric acids, gluconic acid, glucuronic acid, mannonic acid, mannuronic acid, galactonic acid, galacturonic acid, glyceric acid, xylonic acid, neuraminic acid, iduronic acid, oxalic acid, malonic acid, succinic acid, glutaric acid, adipic acid, pimelic acid, suberic acid, azelaic acid, sebacic acid, phthalic acid, isophthalic acid, terephthalic acid, maleic acid, fumaric acid, glutaconic acid, traumatic acid, muconic acid, citric acid, isocitric acid, aconitic acid, propane-1,2,3-tricarboxylic acid, trimesic acid, glycolic acid, lactic acid, malic acid, citric acid, tartaric acid, mandelic acid, 2-hydroxybutyric acid, 3-hydroxybutyric acid, 4-hydroxybutyric acid, 3-hydroxypropionic acid, 3-hydroxyisovaleric acid, salicylic acid, polycarboxylic acids, and mixtures thereof.

3. The method of claim 1, wherein the ionic liquid sorbant is flowed over at least one extended surface.

4. The method of claim 3, wherein the at least one extended surface comprises at least one selected from the group consisting of aluminum, copper, ferrous materials, alloys thereof, polymeric materials, cellulosic materials, and organic and inorganic fibrous materials.

5. The method of claim 1, wherein the gas stream is air.

6. The method of claim 1, further comprising:
    regenerating the ionic liquid sorbant after it sorbs the at least part of the carbon dioxide vapor component and the water vapor component; and
    flowing the regenerated ionic liquid sorbant to be contacted with the gas stream.

7. The method of claim 6, wherein the regenerating comprises boiling the ionic liquid sorbant, passing warm air over the ionic liquid sorbant, or flowing the ionic liquid sorbant over a heated extended surface while passing heated or unheated air through the extended surface.

8. The method of claim 6, wherein the regenerating comprises passing a second airstream of lower vapor pressure than the sorbed stream over the ionic liquid sorbant to remove a portion of the collected vapor.

9. The method of claim 1, wherein a relative humidity of the gas stream after the sorbing is from about 1% to about 50%.

10. The method of claim 1, wherein a flow rate of the ionic liquid sorbant is from about 0.1 gpm/1000 scfm to about 10 gpm/1000 scfm.

11. The method of claim 1, wherein adsorbant materials are dissolved, dispersed, or gelled into the ionic liquid sorbant.

12. The method of claim 11, wherein the adsorbant materials are selected from the group consisting of silica gel, alumina, activated carbon, zeolite, molecular sieve, polysaccharides, polyalcohols, polymer sorbants, or solid adsorbants.

13. The method of claim 1, wherein at least one salt with inorganic cations and organic or inorganic anions is dissolved in the ionic liquid sorbant.

14. An apparatus for concurrently sorbing carbon dioxide and water vapor components from a gas stream comprising:
    a pump that circulates an ionic liquid sorbant with an ionic component having the formula $[A]^+_a[B]^{a-}$, where (i) $[A]^+$ is a cation, and (ii)$[B]^{a-}$ is an anion selected from the group consisting of carbanions, carboxylate anions, arylsulfonate anions, and alkylsulfonate anions, and the sorbant has a water content of from about 1% to about 10% water per mass of ionic component before absorption of the vapor components,
    at least one surface that supports the circulated ionic liquid sorbant;
    an inlet that inputs a gas stream comprising at least the carbon dioxide vapor component and the water vapor component to the at least one surface supporting the circulated ionic liquid sorbant, whereby at least part of the carbon dioxide vapor component and the water vapor component is concurrently sorbed by the ionic liquid sorbant; and
    an outlet that outputs the gas stream after the sorption.

15. The apparatus according to claim 14, further comprising:
    a collecting chamber that collects the ionic liquid sorbant; and
    a regenerator that removes carbon dioxide and water from the collected ionic liquid sorbant.

16. The apparatus of claim 14, further comprising heating or cooling elements.

17. The apparatus of claim 14, wherein the at least one surface comprises at least one selected from the group consisting of aluminum, copper, ferrous materials, alloys thereof, polymeric materials, cellulosic materials, and organic or inorganic fibrous materials.

18. The method of claim 1, further comprising sorbing from the gas stream into the ionic liquid sorbant at least one vapor component selected from the group consisting of $H_2S$, HCN, $NO_x$, $HNO_3$, RCOH, RCOOH, RCOOR', ROH, RSH, RSR, HF, HCl, $SO_2$, $SO_3$, $NH_3$, $NH_2R$, NHR'R'', NR'R''R'''.

19. The method of claim 1, further comprising sorbing from the gas stream into the ionic liquid sorbant at least one vapor component selected from the group consisting of $H_2S$, $NO_x$, $SO_x$, HCl, RSH, and $NH_3$.

20. The method of claim 1, wherein the cation $[A]^+$ is selected from the group consisting of imidazolium, methylimidazolium, ethylimidazolium, 1,3-dimethylimidazolium, 1-ethyl-3-methylimidazolium, 1-propyl-3-methylimidazolium, 1-iso-propyl-3-methylimidazolium, C1-C4 tetraalkylammonium, C1-C4 (2-hydroxyethyl)trialkylammonium, C1-C4 bis(2-hydroxyethyl)dialkylammonium, C1-C4 tris(2-hydroxyethyl)alkylammonium, C1-C4 (2-methoxyethyl)trialkylammonium, C1-C4 bis(2-methoxyethyl)dialkylammonium, C1-C4 tris(2-methoxyethyl)alkylammonium, C1-C4 (2-methoxyethyl)trialkylammonium, C1-C4 tetraalkylphosphonium, C1-C4 trialkylammonium, and C1-C4 dialkylammonium.

21. The method of claim 1, wherein the cation $[A]^+$ is selected from the group consisting of 1-ethyl-3-methylimidazolium, C1-C4 tetraalkylammonium, C1-C4 tetraalkylphosphonium, (2-methoxyethyl)trimethylammonium, bis(2-methoxyethyl)dimethylammonium, tris(2-methoxyethyl)methylammonium, tris(2-hydroxyethyl)methylammonium, tris(2-hydroxyethyl)ethylammonium, and diethylmethylammonium.

22. The method of claim 1, wherein the anion $[B]^{a-}$ is a C1-C4 alkylsulfonate.

23. The method of claim 1, wherein the anion $[B]^{a-}$ is methanesulfonate.

24. The method of claim 1, wherein the anion $[B]^{a-}$ is a carboxylate anion having the general formula $[R''—COO]^-$.

25. The method of claim 1, wherein the anion $[B]^{a-}$ is acetate.

26. A method for concurrently sorbing carbon dioxide and water vapor components from a gas stream comprising:
flowing an ionic liquid sorbant having an ionic component with the formula $[A]^+_a[B]^{a-}$, where (i) $[A]^+$ is a cation, and (ii) $[B]^{a-}$ is a carboxylate anion having the general formula $[R''—COO]^-$, and R'' is one of an aliphatic, cyclic, acyclic, aromatic or araliphatic moiety having one to thirty carbon atoms, and which may comprise one or more heteroatoms and/or which may be substituted by one or more functional groups or halogen, and the sorbant has a water content of from about 1% to about 10% water per mass of ionic component before absorption of the vapor components,
contacting the ionic liquid sorbant with the gas stream which comprises at least the carbon dioxide vapor component and the water vapor component; and
concurrently sorbing at least part of the carbon dioxide vapor component and the water vapor component into the ionic liquid sorbant.

27. The method of claim 26, wherein the carboxylate anion is acetate.

28. The method of claim 27, wherein the cation $[A]^+$ is selected from the group consisting of 1-ethyl-3-methylimidazolium, C1-C4 tetraalkylammonium, and C1-C4 tetraalkylphosphonium.

29. The method of claim 28, wherein the ionic liquid sorbant has a water content of about 10% water per mass of ionic component before absorption of vapor components.

30. A method for sorbing a water vapor component from a gas stream comprising:
flowing an ionic liquid sorbant having an ionic component with the formula $[A]^+_a[B]^{a-}$, where (i) $[A]^+$ is a cation, and (ii) $[B]^{a-}$ is a an alkyl- or aryl-sulfonate anion,
contacting the ionic liquid sorbant with the gas stream which comprises the water vapor component; and
sorbing at least part of the water vapor component into the ionic liquid sorbant,
wherein the relative humidity of the gas stream during the sorbing is from about 20% to about 100%.

31. The method according to claim 30, wherein the anion $[B]^{a-}$ is methanesulfonate.

32. The method according to claim 31, wherein the cation $[A]^+$ is selected from the group consisting of 1-ethyl-3-methylimidazolium, (2-methoxyethyl)trimethylammonium, bis(2-methoxyethyl)dimethylammonium, tris(2-methoxyethyl)methylammonium, tris(2-hydroxyethyl)methylammonium, tris(2-hydroxyethyl)ethylammonium, and diethylmethylammonium.

33. The method of claim 32, wherein the ionic liquid sorbant has a water content of from about 1% to about 60% water per mass of ionic component before absorption of the water vapor component.

34. The method of claim 32, wherein the ionic liquid sorbant has a water content of from about 10% to about 50% water per mass of ionic component before absorption of the water vapor component.

35. The method of claim 1, wherein the $[B]^{a-}$ is the carbanion.

36. The method of claim 14, wherein the $[B]^{a-}$ is the carbanion.

37. The method of claim 1, wherein the sorbant has a water content of about 10% water per mass of ionic component before absorption of the vapor component.

* * * * *